United States Patent
Ebenezer et al.

(10) Patent No.: US 6,864,361 B2
(45) Date of Patent: Mar. 8, 2005

(54) FIBRE REACTIVE AZO DYES

(75) Inventors: Warren James Ebenezer, Stockport (GB); Werner Russ, Flörsheim (DE)

(73) Assignee: DyStar Textilfarben GmbH & Co. Deutschland KG (DE)

(*) Notice: Subject to any disclaimer, the term of this patent is extended or adjusted under 35 U.S.C. 154(b) by 63 days.

(21) Appl. No.: 10/611,438

(22) Filed: Jul. 1, 2003

(65) Prior Publication Data
US 2004/0107517 A1 Jun. 10, 2004

(30) Foreign Application Priority Data
Jul. 10, 2002 (GB) ............................... 0215982

(51) Int. Cl.$^7$ .................... C09B 62/08; D06P 1/382
(52) U.S. Cl. .................. 534/617; 534/618; 534/634; 8/549
(58) Field of Search ................ 534/617, 618, 534/634; 8/549

(56) References Cited

U.S. PATENT DOCUMENTS 6,248,871 B1 * 6/2001 Ebenezer et al. .......... 534/634

FOREIGN PATENT DOCUMENTS

| EP | 0126265 | | 11/1984 |
|---|---|---|---|
| EP | 717089 | * | 6/1996 |
| WO | 99/05224 | | 2/1999 |
| WO | 00/08104 | | 2/2000 |

* cited by examiner

*Primary Examiner*—Fiona T. Powers
(74) *Attorney, Agent, or Firm*—Connolly Bove Lodge & Hutz LLP

(57) ABSTRACT

The present invention refers to dyestuffs of the formula I

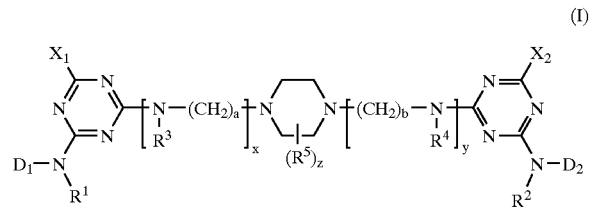

(I)

wherein
each of $R^1$, $R^2$, $R^3$, $R^4$ and $R^5$, independently, is H or an optionally substituted alkyl group;
each of $X_1$ and $X_2$, independently, is a labile atom or group;
each of x and y, independently, is 0 or 1 and at least one of x and y is 1;
each of a and b is 2 to 5 and when each of x and y is 1, a>b; and z is 0, 1, 2, 3 or 4; and
wherein the variables $D_1$ and $D_2$ are defined as given in claim 1, processes for their preparation and their use for dyeing and printing hydroxy- and/or carboxamido-containing fiber materials.

14 Claims, No Drawings

FIBRE REACTIVE AZO DYES

The present invention relates to the field of fibre-reactive dyes.

Dyestuffs containing chromophores linked via a piperazine type linking unit are known from literature and are described for example in EP-A-0126265, EP-A-0693538, WO99/05224 and WO00/08104.

The inventor of the present invention has surprisingly found that dyestuffs with very strong and economic shades exhibiting excellent fastness properties can be obtained if piperazine type linking units are used to link two chromophores each selected from a specific range of chromophores as defined below.

The present invention claims dyestuffs of the formula I

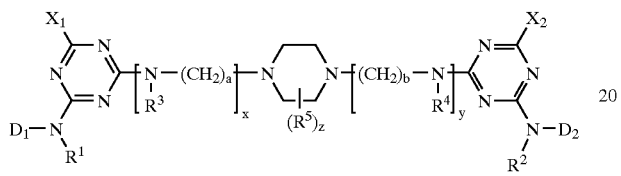

(I)

wherein
each of $R^1$, $R^2$, $R^3$, $R^4$ and $R^5$, independently, is H or an optionally substituted alkyl group;
each of $X_1$ and $X_2$, independently, is a labile atom or group;
each of x and y, independently, is 0 or 1 and at least one of x and y is 1;
each of a and b is 2 to 5 and when each of x and y is 1, a>b; and
z is 0, 1, 2, 3 or 4;
$D_1$ is a group of the formula II

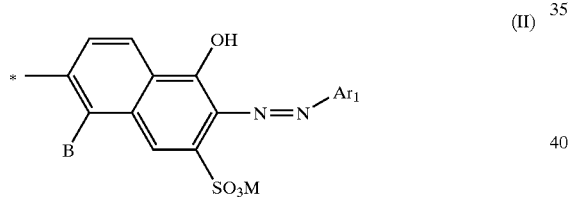

(II)

wherein
B is H or $SO_3M$;
M is H, an alkali metal, an ammonium ion or the equivalent of an alkaline earth metal;
* indicates the bond to the triazinylamino group;
$Ar_1$ is a group of the formula III or of the formula IV

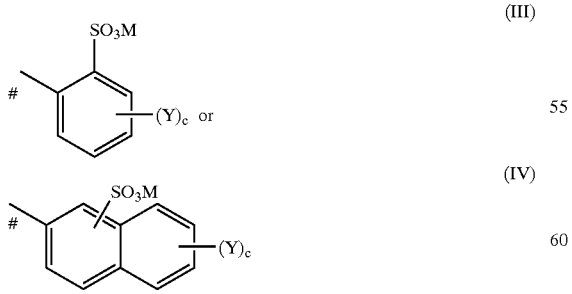

(III)

(IV)

wherein
the or each Y independently is $SO_3M$ or an alkyl group, c is 0, 1 or 2, M is defined as given above and # indicates the bond to the azo group; or $D_1$ is a group of the formula IIa

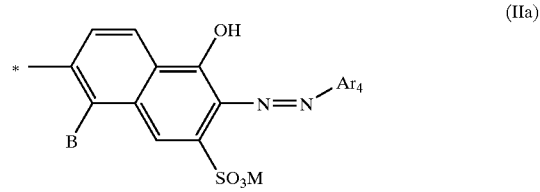

(IIa)

wherein
B is H or $SO_3M$;
M is H, an alkali metal, an ammonium ion or the equivalent of an alkaline earth metal;
* indicates the bond to the triazinylamino group;
$Ar_4$ is a group of the formula IIIa or of the formula IVa

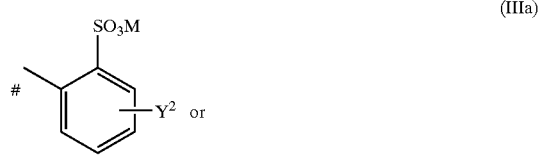

(IIIa)

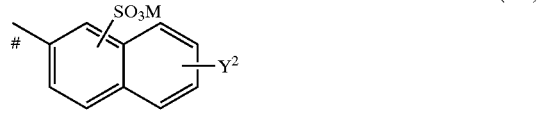

(IVa)

wherein
$Y^2$ is $-N=N-Ar_5$, M is defined as given above and # indicates the bond to the azo group, wherein
$Ar_5$ is a group of the formula IIIb or of the formula IVb

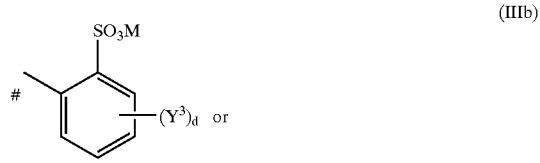

(IIIb)

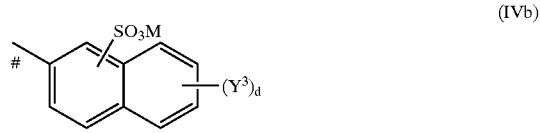

(IVb)

wherein the or each $Y^3$ independently is $SO_3M$ or an alkyl group, d is 0, 1 or 2, M is defined as given above and # indicates the bond to the azo group; or
$D_1$ is a group of the formula V

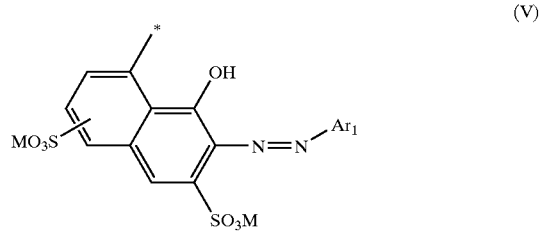

(V)

wherein
M, * and $Ar_1$ are defined as given above; or $D_1$ is a group of the formula VI

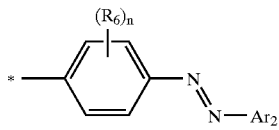
(VI)

wherein
* is defined as given above
n is 0, 1, 2 or 3;
the or each $R_6$ independently is H, $(C_1-C_4)$-alkyl, $(C_1-C_4)$-alkoxy, $NHCONH_2$, $NHCO(C_1-C_4)$-alkyl, $SO_3M$ or halogen;
$Ar_2$ is a group of the formula VII or of the formula VIII

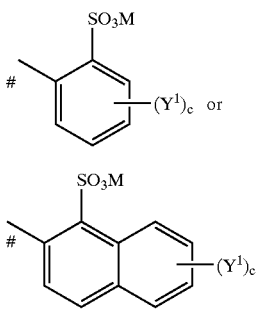
(VII)

(VIII)

wherein
the or each $Y^1$ independently is $SO_3M$ or an alkyl group or $-N=N-Ar_3$,
wherein $Ar_3$ is an optionally substituted phenylene or naphthylene moiety;
c is 0, 1 or 2, M is defined as given above and # indicates the bond to the azo group; or
$D_1$ is a group of the formula XV

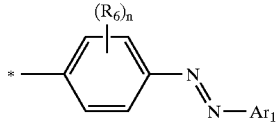
(XCV)

wherein $R^6$, $Ar_1$, n and * are defined as given above; or
$D_1$ is an azoacetoacetamidoaryl, azopyridone, azopyrazolone or an azopyrimidine chromophore;
$D_2$ is a group of the formula II, provided $D_1$ is not a group of the formula V; or
$D_2$ is a group of the formula IIa; or
$D_2$ is a group of the formula IX

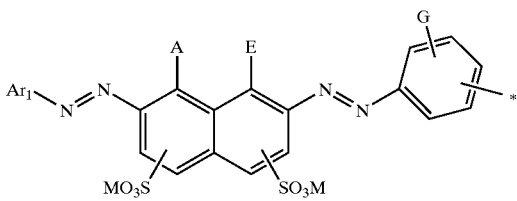
(IX)

wherein
A and E are independently OH or $NH_2$ and $A \neq E$;
G is H, $(C_1-C_4)$-alkyl, $(C_1-C_4)$-alkoxy, $SO_3M$ or halogen; and
$Ar_1$, M and * are defined as given above; or $D_2$ is a group of the formula VI; or
$D_2$ is a group of the formula X

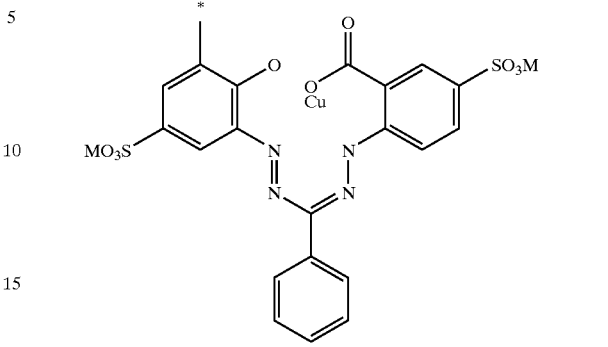
(X)

wherein M and * are defined as given above; or
$D_2$ is a group of the formula XI

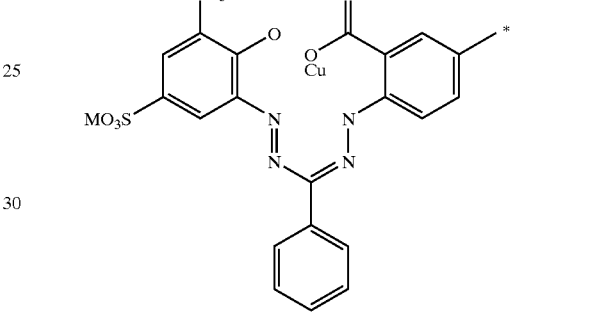
(XI)

wherein M and * are defined as given above; or
$D_2$ is a group of the formula XII

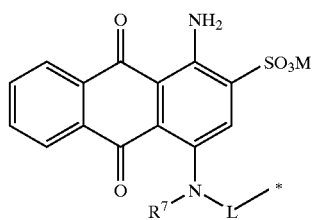
(XII)

wherein
$R^7$ is H or $(C_1-C_4)$-alkyl;
L is a divalent moiety and
M and * are defined as given above; or
$D_2$ is a group of the formula XIII

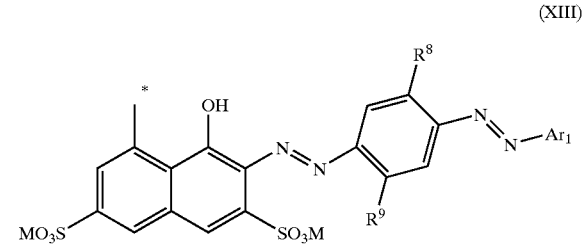
(XIII)

wherein
$R^8$ and $R^9$, independently, are H, halogen, $(C_1-C_4)$-alkyl or $(C_1-C_4)$-alkoxy;
and M, $Ar_1$ and * are defined as given above; or $D_2$ is a group of the formula XIV

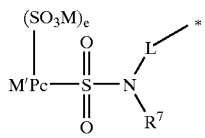
(XIV)

wherein

M' is a metal atom;

Pc is a phthalocyanine chromophore;

e is <4; and

M, L and $R^7$ are defined as given above; or $D_2$ is a group of the formula XV; or $D_2$ is an azoacetoacetamidoaryl, azopyridone, azopyrazolone or an azopyrimidine chromophore.

Alkyl groups may be straight-chain or branched and are preferably $(C_1–C_4)$-alkyl groups, for example methyl, ethyl, n-propyl, i-propyl or n-butyl. Substituted alkyl groups are preferably substituted by hydroxyl, $(C_1–C_4)$-alkoxy, halogen or carboxyl groups.

The same logic applies for alkoxy groups, which are thus preferably $(C_1–C_4)$-alkoxy groups and particularly methoxy and ethoxy.

Substituted phenylene or naphthylene moieties standing for $Ar_3$ are preferably of the formulae III and IV above.

A divalent moiety L occurring in the groups of the formulae XII and XIV is preferably a phenylene or $(C_1–C_6)$-alkylene, preferably $(C_1–C_4)$-alkylene moiety.

The phenylene moiety is optionally substituted by $(SO_3M)_f$, where f=0, 1, or 2 and $(R_{18})_g$, where $R_{18}$ is $(C_1–C_4)$-alkyl, $(C_1–C_4)$-alkoxy or halogen.

$R^1$ to $R^5$ are preferably H or methyl. $R^3$, $R^4$ and $R^5$ are especially preferably H.

$X_1$ and $X_2$ are preferably halogen like fluorine and chlorine or optionally substituted pyridinium like 3- and 4-carboxypyridinium. $X_1$ and $X_2$ are especially preferably chlorine.

M is preferably H, an alkaline metal, like sodium, potassium and lithium and is especially preferably sodium.

M' is preferably Cu, Ni or Al.

An azoacetoacetamidoaryl, azopyridone, azopyrazolone or an azopyrimidine chromophore standing for $D_1$ or $D_2$ is preferably an optionally metallized monoazo chromophore of the formulae (XVIa) or (XVIb)

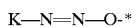 (XVIa)

 (XVIb)

wherein

* indicates the bond to the triazinylamino group in formula I; and one of K and O is an acetoacetamidoaryl group wherein the aryl moiety is optionally substituted and wherein the azo linkage in the formulae XVIa and XVIb is linked to the methylene group of the acetoacetamidoaryl group; an optionally substituted pyridonly group; an optionally substituted pyrazolonyl group or an optionally substituted pyrimidinyl group;

and the other of K and O is a phenyl or napthyl group which is unsubstituted or substituted by one to four substituents selected from the group consisting of $(C_1–C_4)$-alkyl, $(C_1–C_4)$-alkoxy, $H_2NCONH$, $CH_3CONH$, NHCO $(C_1–C_4)$, hydroxyl, amino, cyano, $(C_1–C_4)$-alkyl-amino, halogen, COOM, $SO_3M$, aminophenyl, aminonaphthyl, $(C_1–C_4)$-alky-aminophenyl, $(C_1–C_4)$-alkyl-aminonaphthyl, amidophenyl, amidonaphthyl, sulphonamidophenyl and sulfonamidonaphthyl, wherein M is defined as given above.

An acetoacetamidoaryl group can be substituted in its aryl moiety preferably by $(C_1–C_4)$-alkyl, $(C_1–C_4)$-alkoxy, halogen, $H_2NCONH$, $CH_3CONH$ or $SO_3M$, wherein M is defined as given above.

Preferred acetoacetamidoaryl groups are of the formulae XVII and XVIII

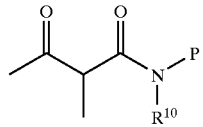
(XVII)

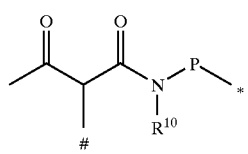
(XVIII)

wherein $R^{10}$ is H or $(C_1–C_4)$-alkyl;

P is an optionally substituted aryl group;

# indicates the bond to the azo group of the monoazo chromophore of formulae (XVIa) and (XVIb); and

* indicates the bond to the triazinylamino group of the dyestuff of formula I.

P is preferably phenyl or naphthyl which is optionally substituted by $(C_1–C_4)$-alkyl, $(C_1–C_4)$-alkoxy, halogen, nitro, $H_2NCONH$, $CH_3CONH$ or $SO_3M$, wherein M is defined as given above.

An optionally substituted pyridonyl group is preferably of the formulae (XIX) or (XX)

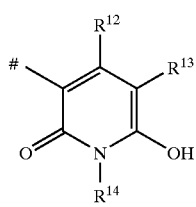
(XIX)

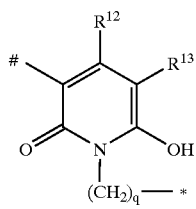
(XX)

wherein $R^{12}$ is H, $(C_1–C_4)$-alkyl or phenyl;

$R^{13}$ is H, $(C_1–C_4)$-alkyl, CN, $CONH_2$ or $CH_2SO_3M$, wherein M is defined as given above;

$R^{14}$ is $(C_1–C_4)$-alkyl or phenyl;

q is zero or is 1–4;

# indicates the bond to the azo group of the monoazo chromophore of formulae (XVIa) and (XVIb); and

* indicates the bond to the triazinylamino group of the dyestuff of the formula I.

An optionally substituted pyrazolonyl group is preferably of the formulae (XXI) or

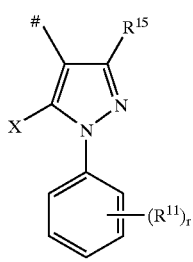
(XXI)

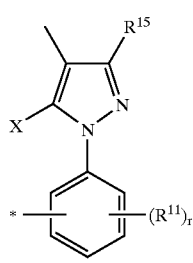
(XXII)

wherein

R$^{15}$ is methyl, carboxyl or methoxycarbonyl;
X is OH or NH$_2$;
the or each R$^{11}$, independently, is (C$_1$–C$_4$)-alkyl, (C$_1$–C$_4$)-alkoxy, halogen, H$_2$NCONH, CH$_3$CONH or SO$_3$M, wherein M is defined as given above;
r is zero or 1–4, preferably zero or 1–3, still more preferably 0, 1 or 2, especially 1 or 2;
# indicates the bond to the azo group of the monoazo chromophore of formulae (XVIa) and (XVIb); and
* indicates the bond to the triazinylamino group of the dyestuff of the formula I.

An optionally substituted pyrimidinyl group is preferably of the formula (XXIII)

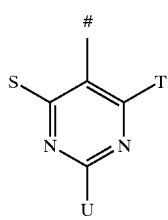
(XXII)

wherein each of S, T and U, independently, is H, (C$_1$–C$_4$)-alkoxy, hydroxy, (C$_1$–C$_4$)-alkylthio, mercapto, amino, (C$_1$–C$_4$)-alkyl-amino or di-(C$_1$–C$_4$)-alkyl-amino; and # indicates the bond to the azo group of the monoazo chromophore of formulae (XVIa) and (XVIb).

Preferred dyestuffs of the formula (I) are bright orange dyestuffs, wherein D$_1$ and D$_2$ both are a group of formula (II), with the proviso, however, that D$_1$≠D$_2$ or D$_1$=D$_2$ if R$^1$≠R$^2$.

In still more preferred bright orange dyestuffs of the formula (I)

X$_1$ and X$_2$ are both chlorine;
R$^3$, R$^4$ and R$^5$ are H;
a=b=2 with x=0 and y=1 or x=1 and y=0; and
D$_1$ and D$_2$ are both a group of the formula (IIa)

(IIa)

wherein B and M are defined as given above,

In especially preferred bright orange dyestuffs of the formula (I)

D$_1$ is a group of the formula (IIb)

(IIb)

and D$_2$ is a group of formula (IIc)

(IIc)

or D$_1$ and D$_2$ are both a group of formula (IIc) and R$^1$≠R$^2$, especially one of R$^1$ and R$^2$ is H and the other methyl.

Especially preferred bright orange dyestuffs of the formula (I) are of the formulae (Ia) and (Ib)

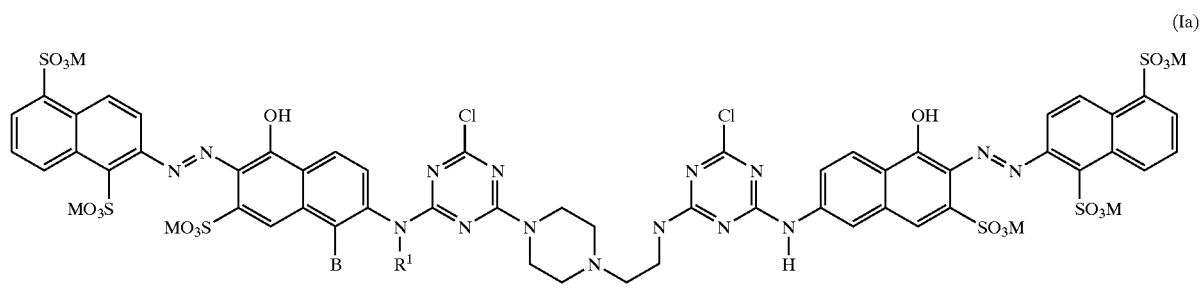

(Ia)

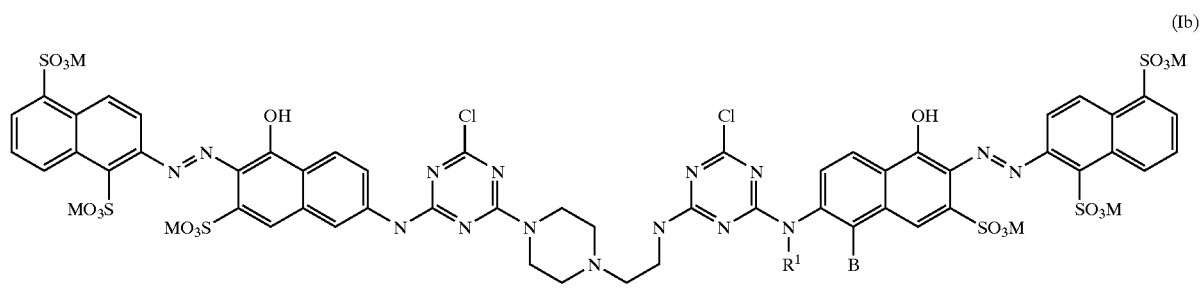

(Ib)

wherein

B is SO₃M and R¹ is H or B is H and R¹ is methyl and M is defined as given above.

Further preferred dyestuffs of the formula (I) are homogeneous black dyestuffs, wherein $D_1$ is a group of the formula (II) and
$D_2$ is a group of the formula (IX).

In still more preferred homogeneous black dyestuffs of the formula (I)

$X_1$ and $X_2$ are both chlorine;
$R^3$, $R^4$ and $R^5$ are H;
a=b=2 with x=0 and y=1 or x=1 and y=0;
$D_1$ is a group of the formula (IIa)

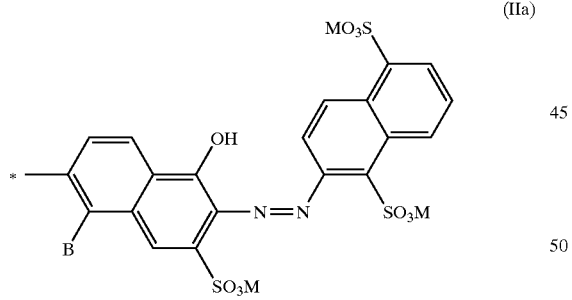

(IIa)

wherein B and M are defined as given above; and $D_2$ is a group of the formula (IXa)

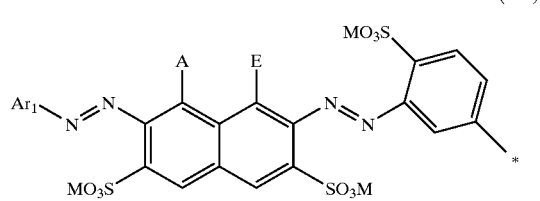

(IXa)

wherein A is OH and E is NH₂ or A is NH₂ and E is OH and $Ar_1$ and M are defined as given above. A is especially preferred NH₂ and E is OH.

Especially preferred homogeneous black dyestuffs of the formula (I) are of the formulae (Ic) and (Id)

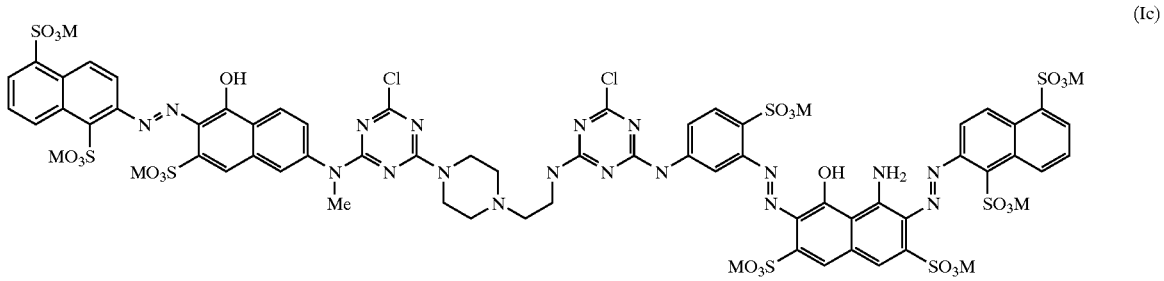

(Ic)

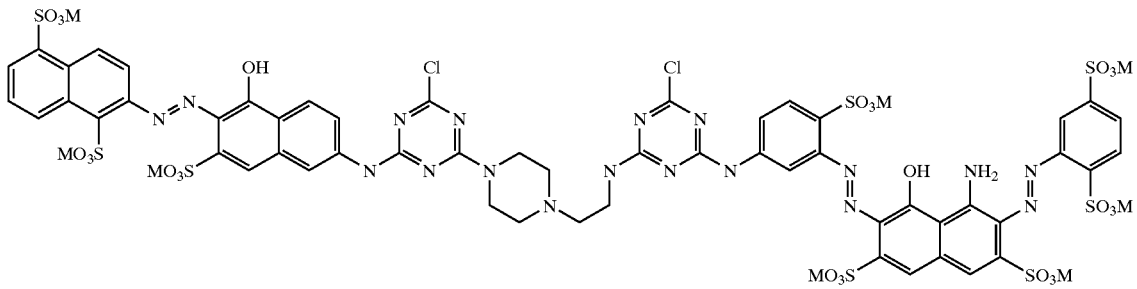

(Id)

wherein M is defined as given above.

Further preferred dyestuffs of the formula (I) are dull red dyestuffs, wherein
$D_1$ is a group of the formula (V) and
$D_2$ is a group of the formula (XV).

In still more preferred dull red dyestuffs of the formula (I)
$X_1$ and $X_2$ are both chlorine;
$R^3$, $R^4$ and $R^5$ are H;
a=b=2 with x=0 and y=1 or x=1 and y=0;
$D_1$ is a group of the formula (Va)

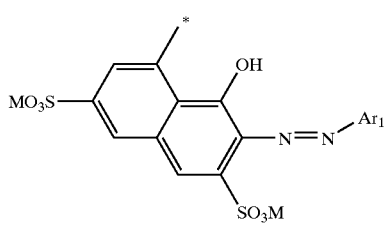
(Va)

wherein $Ar_1$, M and * are defined as given above; and
$D_2$ is a group of the formula (XVa)

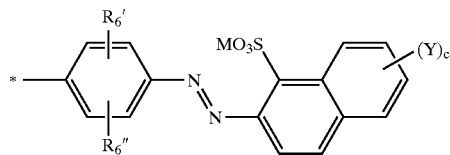
(XVa)

wherein
$R_6'$ is H, $(C_1-C_4)$-alkyl, $(C_1-C_4)$-alkoxy or halogen;
$R_6''$ is H, $NHCONH_2$, $NHCO(C_1-C_4)$-alkyl or $SO_3M$; and
Y, c and M are defined as given above.

Especially preferred dull red dyestuffs of the formula (I) are of the formula (Ie)

wherein
a is 1 and b is 0 or a is 0 and b is 1;
$Ar_1'$ is 2-sulphophenyl, 2,5-disulphophenyl, 1-sulpho-2-naphthyl or 1,5-disulpho-2-naphthyl and
$Ar_1''$ is 4,8-disulpho-2-naphthyl or 3,6,8-trisulpho-2-naphthyl.

Further preferred dyestuffs of the formula (I) are homogeneous green dyestuffs,
wherein
$D_1$ is a group of the formula (XV) or an azoacetoacetamidoaryl, azopyridone, azopyrazolone or an azopyrimidine chromophore; and
$D_2$ is a group of the formula (IX), a group of the formula (X), a group of the formula (XI), a group of the formula (XII), a group of the formula (XIII) or a group of the formula (XIV).

In still more preferred homogeneous green dyestuffs of the formula (I)
$X_1$ and $X_2$ are both chlorine;
$R^3$, $R^4$ and $R^5$ are H; and
a=b=2 with x=0 and y=1 or x=1 and y=0.

Further preferred dyestuffs of the formula (I) are yellow dyestuffs, wherein
$D_1$ is a group of the formula (II), a group of the formula (VI) or an azoacetoacetamidoaryl, azopyridone, azopyrazolone or an azopyrimidine chromophore; and
$D_2$ is a group of the formula (VI), or an azoacetoacetamidoaryl, azopyridone, azopyrazolone or an azopyrimidine chromophore.

In still more preferred homogeneous green dyestuffs of the formula (I)
$X_1$ and $X_2$ are both chlorine;
$R^3$, $R^4$ and $R^5$ are H; and
a=b=2 with x=0 and y=1 or x=1 and y=0.

The dyestuffs of the present invention can be present as a preparation in solid or liquid (dissolved) form. In solid form they generally contain the electrolyte salts customary in the case of water-soluble and in particular fibre-reactive dyes,

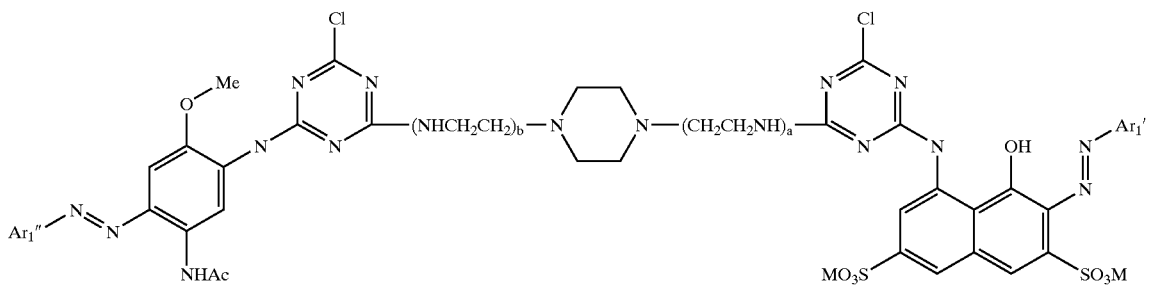
(Ie)

such as sodium chloride, potassium chloride and sodium sulfate, and also the auxiliaries customary in commercial dyes, such as buffer substances capable of establishing a pH in aqueous solution between 3 and 7, such as sodium acetate, sodium borate, sodium bicarbonate, sodium citrate, sodium dihydrogen-phosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

In general, the dyestuffs of the present invention are present as dye powders containing 10 to 80% by weight, based on the dye powder or preparation, of a strength-standardizing colorless diluent electrolyte salt, such as those mentioned above. These dye powders may additionally include the aforementioned buffer substances in a total amount of up to 10%, based on the dye powder. If the dye mixtures of the present invention are present in aqueous solution, the total dye content of these aqueous solutions is up to about 50% by weight, for example between 5 and 50% by weight, and the electrolyte salt content of these aqueous solutions will preferably be below 10% by weight, based on the aqueous solutions. The aqueous solutions (liquid preparations) may include the aforementioned buffer substances in an amount which is generally up to 10% by weight, for example 0.1 to 10% by weight, preference being given to up to 4% by weight, especially 2 to 4% by weight.

A dyestuff of the formula I may for example be prepared by reacting a piperazine compound of the formula XXIII (XXIII)

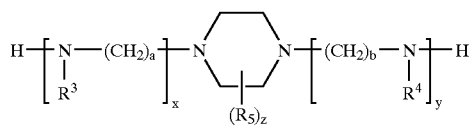

wherein $R^3$, $R^4$, $R^5$, a, b, x, y, and z are defined as given above, with a compound of the formula XXIV (XXIV)

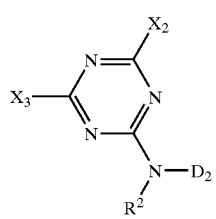

wherein $R^2$, $X_2$ and $D_2$ are defined as given above and $X_3$ is a labile atom or a group capable of reaction with an amine, preferably chlorine,
and with a compound of the formula XXV (XXV)

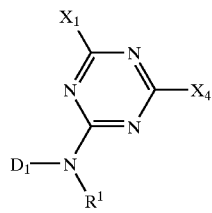

wherein $R^1$, $X_1$ and $D_1$ are defined as given above and $X_4$ has one of the meanings of $X_3$.

It is possible to react a compound of formula XXIII first with a compound of the formula XXIV to form a compound of the formula XXVI (XXVI)

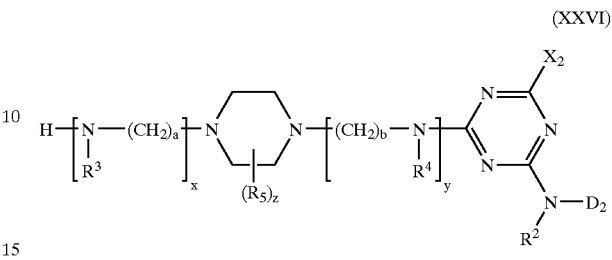

wherein all variables are defined as given above,
which is then reacted with a compound of the formula XXV to a dyestuff of the formula I.

As an alternative is it also possible to react a compound of the formula XXIII first with a compound of the formula XXV to form the compound of the formula XXVII (XXVII)

wherein all variables are defined as given above,
which is then reacted with a compound of the formula XXIV to a dyestuff of the formula I.

In general, one mole of a compound of the formula XXIII is reacted with 1 mole of a compound of the formula XXIV and 1 mole of a compound of the formula XXV in a manner known per se to a skilled person.

The compounds of the formulae XXIII, XXIV and XXV are known or can easily be prepared by a skilled person using methods which are known per se. As an example, a compound of the formula XXIV, wherein $X_2$ is chlorine can be obtained by reacting cyanuric chloride with a compound of the formula XXVIII (XXVIII)

H
\
N—D$_2$
/
R$^2$ wherein $R^2$ and $D_2$ are defined as given above.

The compounds of the formula XXVIII can be prepared by means of customary diazotization and coupling reactions in a manner familiar to those skilled in the art.

The dyestuffs of the instant invention are reactive dyestuffs suitable for dyeing and printing hydroxy- and/or carboxamido-containing fibre materials by the application and fixing methods numerously described in the art for fibre-reactive dyes. They provide exceptionally bright, exceptionally strong and economic shades. Such dyes especially when used for exhaust dyeing of cellulosic materials can exhibit excellent properties including build-up, aqueous solubility, light-fastness, wash off and robustness to process variables. They are also wholly compatible with similar dyes designed for high temperature (80–100° C.) application to cellulosic textiles, and thus lead to highly reproducible application processes, with short application times.

The present invention therefore also provides for use of the inventive dyestuffs for dyeing and printing hydroxy- and/or carboxamido-containing fibre materials and processes for dyeing and printing such materials using a dyestuff according to the invention. Usually the dyestuff is applied to the substrate in dissolved form and fixed on the fibre by the action of an alkali or by heating or both.

Hydroxy-containing materials are natural or synthetic hydroxy-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibres. Regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the inventive dyestuffs is by generally known processes for dyeing and printing fiber materials by the known application techniques for fibre-reactive dyes. The dyestuffs according to the invention are highly compatible with similar dyes designed for high temperature (80–100° C.) applications and are advantageously useful in exhaust dyeing processes.

Similarly, the conventional printing processes for cellulose fibers, which can either be carried out in single-phase, for example by printing with a print paste containing sodium bicarbonate or some other acid-binding agent and the colorant, and subsequent steaming at appropriate temperatures, or in two phases, for example by printing with a neutral or weakly acid print paste containing the colorant and subsequent fixation either by passing the printed material through a hot electrolyte-containing alkaline bath or by overpadding with an alkaline electrolyte-containing padding liquor and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

The inventive dyestuffs can in addition be used to produce inks useful for printing the substrates described above, for example textiles, especially cellulosic textiles, and paper. Such inks can be used in all technologies, for example conventional printing, ink-jet printing or bubble-jet printing (for information on such printing technologies see for example Text. Chem. Color, Volume 19(8), pages 23 ff and Volume 21, pages 27 ff).

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyestuffs according to the invention with the acid-binding agents with or without heating bonds the dyes chemically to the cellulose fibers. Especially the dyeings on cellulose, after they have been given the usual aftertreatment of rinsing to remove unfixed dye portions, show excellent properties.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling auxiliaries, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

EXAMPLE 1

1-(2-aminoethyl) piperazine (2.6 g, 0.02 mol) was added dropwise to a stirred suspension of the orange dichlorotriazinyl dye (3) (0.02 mol) in water (400 mls) at ambient temperature and pH6. The pH was then adjusted to 10 with sodium carbonate solution and maintained at this pH for 20 minutes, yielding a solution of the orange dye (5). To this solution was added the orange dichlorotriazinyl dye (4) (0.02 mol) and the solution was maintained at pH 10 and ambient temperature for 48 hours. The pH was adjusted to 6 with 2N HCl and the dye precipitated by the addition of NaCl. The precipitated dye was filtered off, salt removed by dialysis and dried to give the expected dye (1) (16.0 g).

($\lambda_{max}$=491 nm, $\epsilon$=65500, $v_{1/2}$=115 nm). Other analytical data were in full agreement with the expected structure.

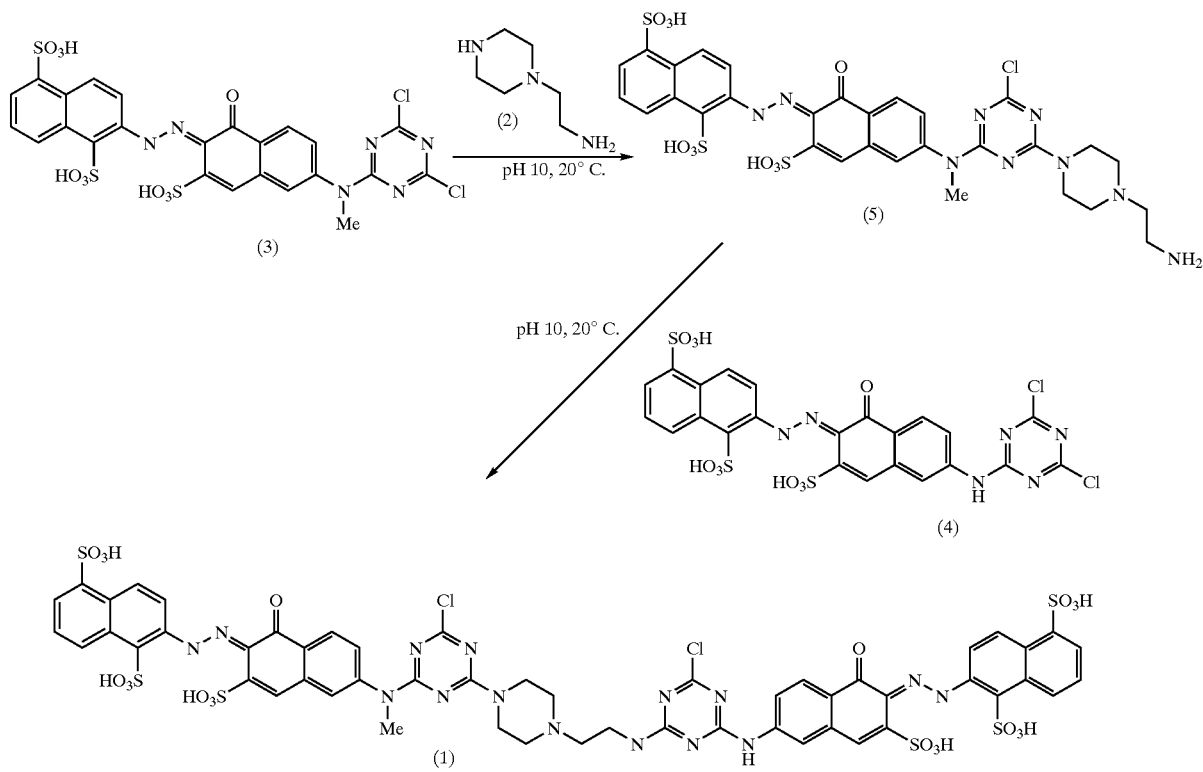

EXAMPLES 2–4

Following exactly analogous procedures as described in Example 1 the following dyes were synthesised.

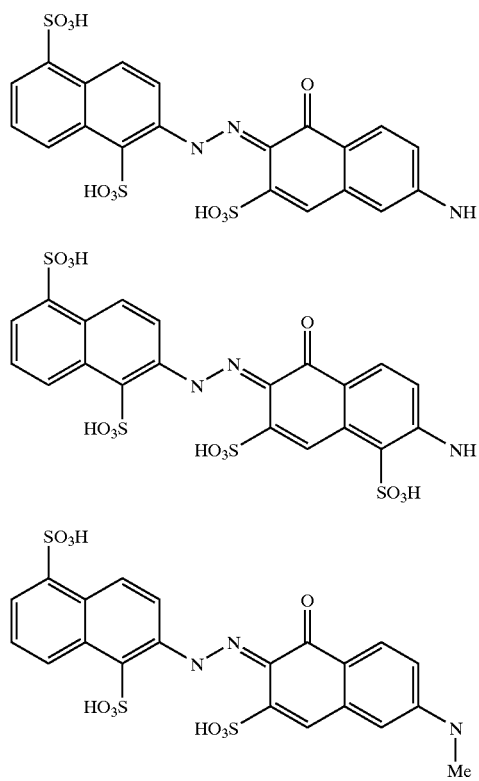

| Example | Dye 1 | Dye 2 | λ max/nm |
|---------|-------|-------|----------|
| 2 | a | c | 495 |
| 3 | a | b | 493 |
| 4 | b | a | 491 |

EXAMPLE 5

1-(2-aminoethyl) piperazine (1.4 g, 0.011 mol) was added dropwise to a stirred suspension of the orange dichlorotriazinyl dye (7) (0.011 mol) in water (400 mls) at ambient temperature and pH6. The pH was then adjusted to 10 with sodium carbonate solution and maintained at this pH for 20 minutes, yielding a slurry of the orange dye (8). To this slurry was added the navy dichlorotriazinyl dye (9) (0.011 mol) and the solution was maintained at pH 10 and ambient temperature for 24 hours. The pH was adjusted to 6 with 2N HCl and the dye precipitated by the addition of methylated spirits. The precipitated dye was filtered off, and dried to give the expected dye (6) (18.0 g).

($\lambda_{max}$=623 nm, $\epsilon$=42500, $\nu_{1/2}$=115 nm). Other analytical data were in full agreement with the expected structure.

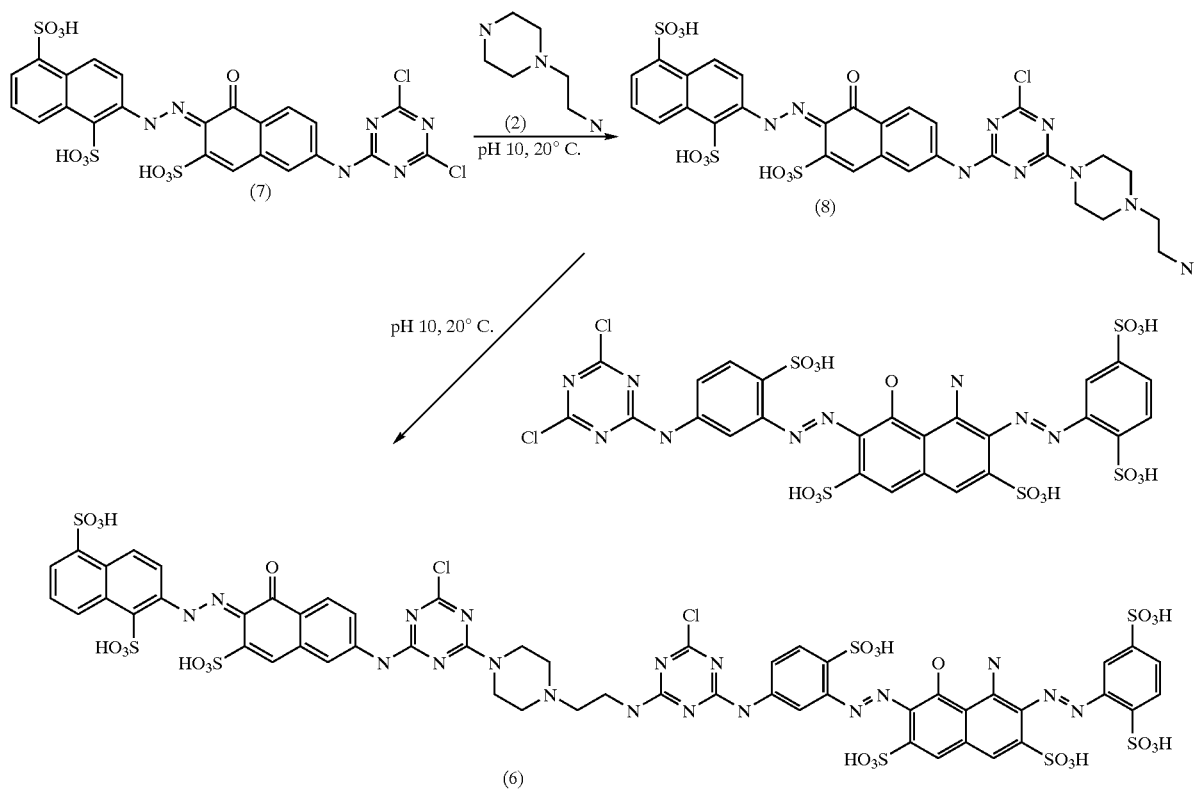

EXAMPLES 6–11

Following exactly analogous procedures as described in Example 5 the following dyes were synthesised.

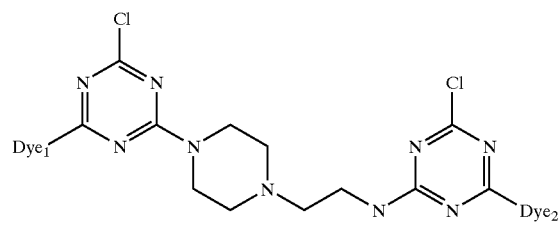

| Example | Dye 1 | Dye 2 | λ max/nm |
|---------|-------|-------|----------|
| 6 | c | f | 614 |
| 7 | c | e | 619 |
| 8 | a | f | 613 |
| 9 | C | h | 618 |

-continued

| Example | Dye 1 | Dye 2 | λ max/nm |
|---------|-------|-------|----------|
| 10 | A | h | 622 |
| 11 | A | d | 608 |

EXAMPLE 12

1-(2-aminoethyl) piperazine (1.0 g, 0.0077 mol) was added dropwise to a stirred suspension of the red dichlorotriazinyl dye (11) (0.0077 mol) in water (300 mls) at ambient temperature and pH6. The pH was then adjusted to 10 with sodium carbonate solution and maintained at this pH for 20 minutes, yielding the red dye (12). To this solution was added the yellow dichlorotriazinyl dye (13) (0.0077 mol) and the solution was maintained at pH 10 and ambient temperature for 24 hours. The pH was adjusted to 6 with 2N HCl and the dye precipitated by the addition of methylated spirits. The precipitated dye was filtered off, and dried to give the expected dye (10) (10.6 g).

($\lambda_{max}$=516 nm, $\epsilon$=46000, $v_{1/2}$=115 nm). Other analytical data were in full agreement with the expected structure.

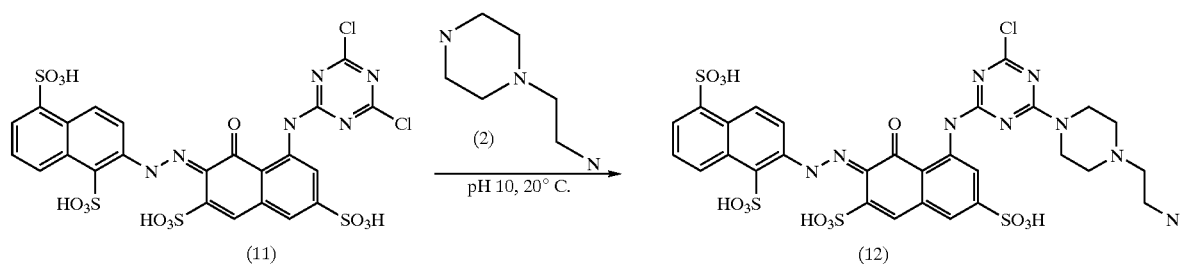
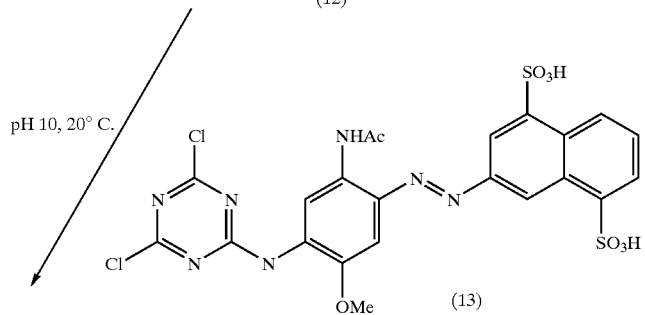
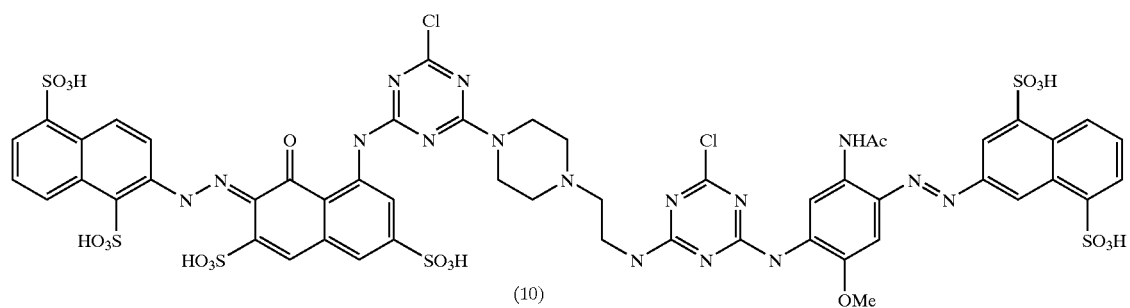
EXAMPLES 13–27
Following exactly analogous procedures as described in Example 12 the following dyes were synthesised.
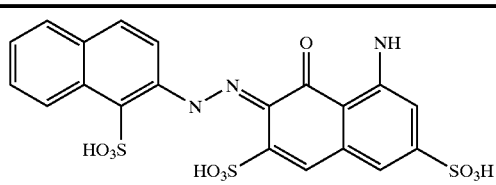
i
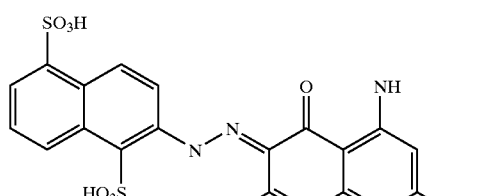
j
-continued
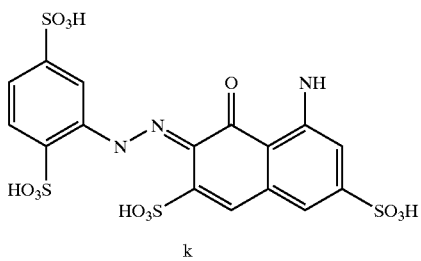
k
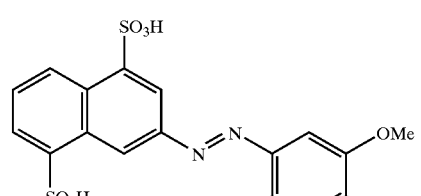
l -continued

| | | | |
|---|---|---|---|
| 15 | i | n | 518 |
| 16 | n | i | 522 |
| 17 | l | j | 520 |
| 18 | j | n | 514 |
| 19 | n | j | 515 |
| 20 | m | l | 436 |
| 21 | l | m | 467 |
| 22 | m | n | 507 |
| 23 | n | m | 507 |
| 24 | k | l | 504 |
| 25 | l | k | 473 |
| 26 | k | n | 506 |
| 27 | n | k | 499 |

EXAMPLE 28

1-(2-aminoethyl) piperazine (0.32 g, 0.0025 mol) was added dropwise to a stirred suspension of the yellow dichlorotriazinyl dye (15) (0.0025 mol) in water (200 mls) at ambient temperature and pH6. The pH was then adjusted to 10 with sodium carbonate solution and maintained at this pH for 20 minutes, yielding the yellow dye (16). To this slurry was added the navy dichlorotriazinyl dye (17) (0.0025 mol) and the solution was maintained at pH 10 and ambient temperature for 4 hours. The pH was adjusted to 6 with 2N HCl and the dye precipitated by the addition of methylated spirits. The precipitated dye was filtered off, and dried to give the expected dye (14) (4.9 g).

($\lambda_{max}$=(415 nm) and 614 nm, $\epsilon$=36800, $\nu_{1/2}$=117 nm). Other analytical data were in full agreement with the expected structure.

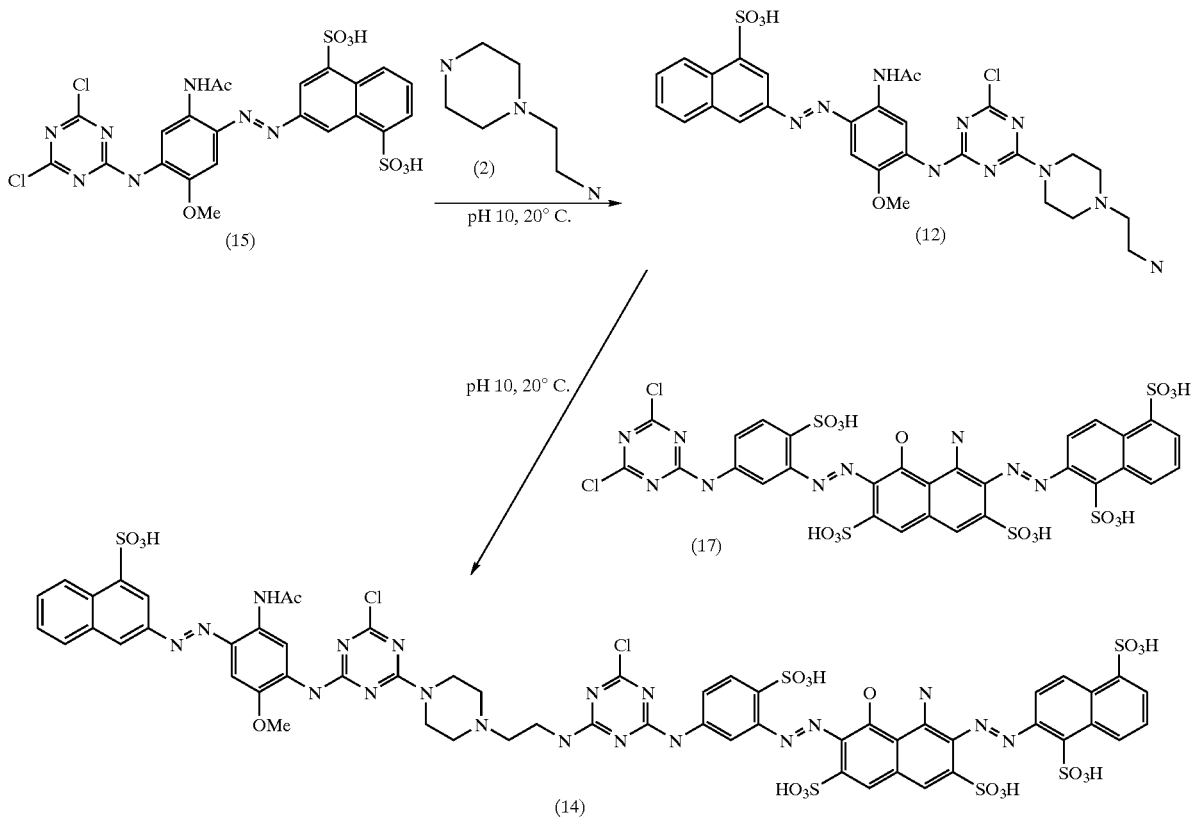

| Example | Dye 1 | Dye 2 | λ max/nm |
|---|---|---|---|
| 13 | i | l | 462 |
| 14 | l | i | 561 |

EXAMPLES 29–38
Following exactly analogous procedures as described in Example 28 the following dyes were synthesised.
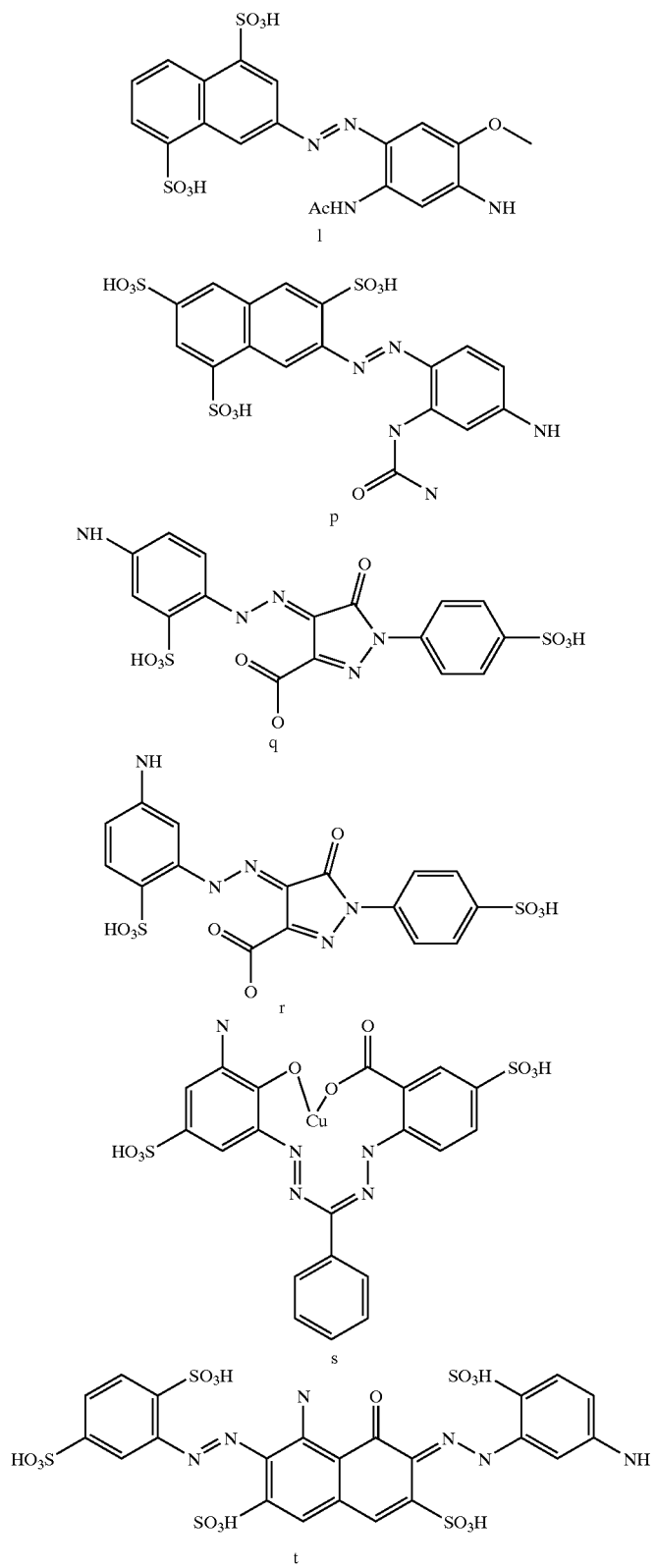

-continued

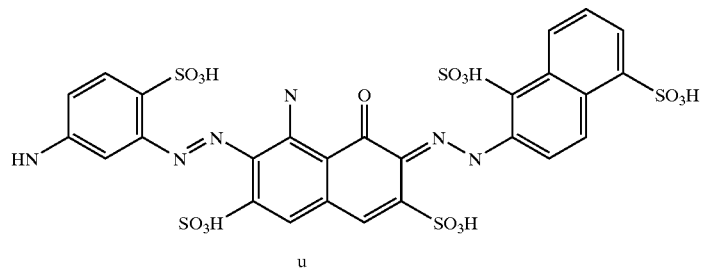

u

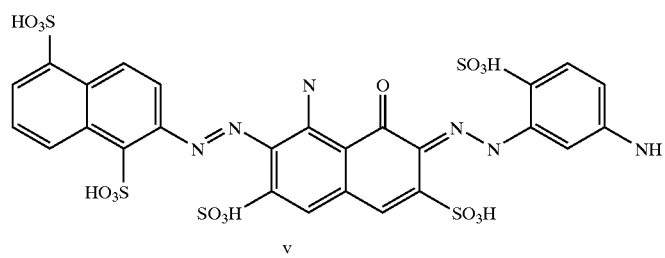

v

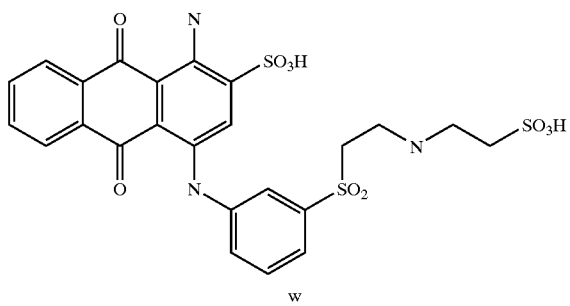

w

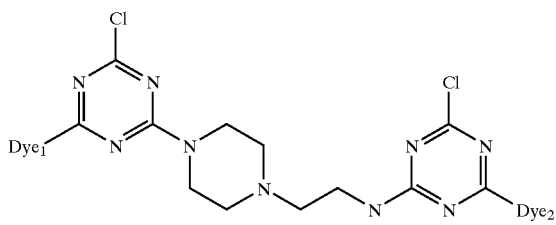

| Example | Dye 1 | Dye 2 | λ max/nm |
|---------|-------|-------|----------|
| 29 | l | u | 420, 626 |
| 30 | p | v | 416, 616 |
| 31 | l | t | 440, 622 |
| 32 | p | t | 426, 622 |
| 33 | q | s | 451, 619 |
| 34 | p | s | 426, 623 |
| 35 | r | s | 620 |
| 36 | l | w | 454, 601 |
| 37 | q | w | 452, 599 |
| 38 | p | w | 416, 636 |

EXAMPLE 39

1-(2-aminoethyl) piperazine (2.6 g, 0.02 mol) was added dropwise to a stirred suspension of the orange dichlorotriazinyl dye (19) (0.02 mol) in water (400 mls) at ambient temperature and pH6. The pH was then adjusted to 10 with sodium carbonate solution and maintained at this pH for 20 minutes, yielding a solution of the orange dye (20). To this solution was added the yellow dichlorotriazinyl dye (21) (0.02 mol) and the solution was maintained at pH 10 and ambient temperature for 48 hours. The pH was adjusted to 6 with 2N HCl and the dye precipitated by the addition of NaCl. The precipitated dye was filtered off, salt removed by dialysis and dried to give the expected dye (18) (16.0 g).

($\lambda_{max}$=485 nm, $\epsilon$=46000, $\nu_{1/2}$=115 nm). Other analytical data were in full agreement with the expected structure.

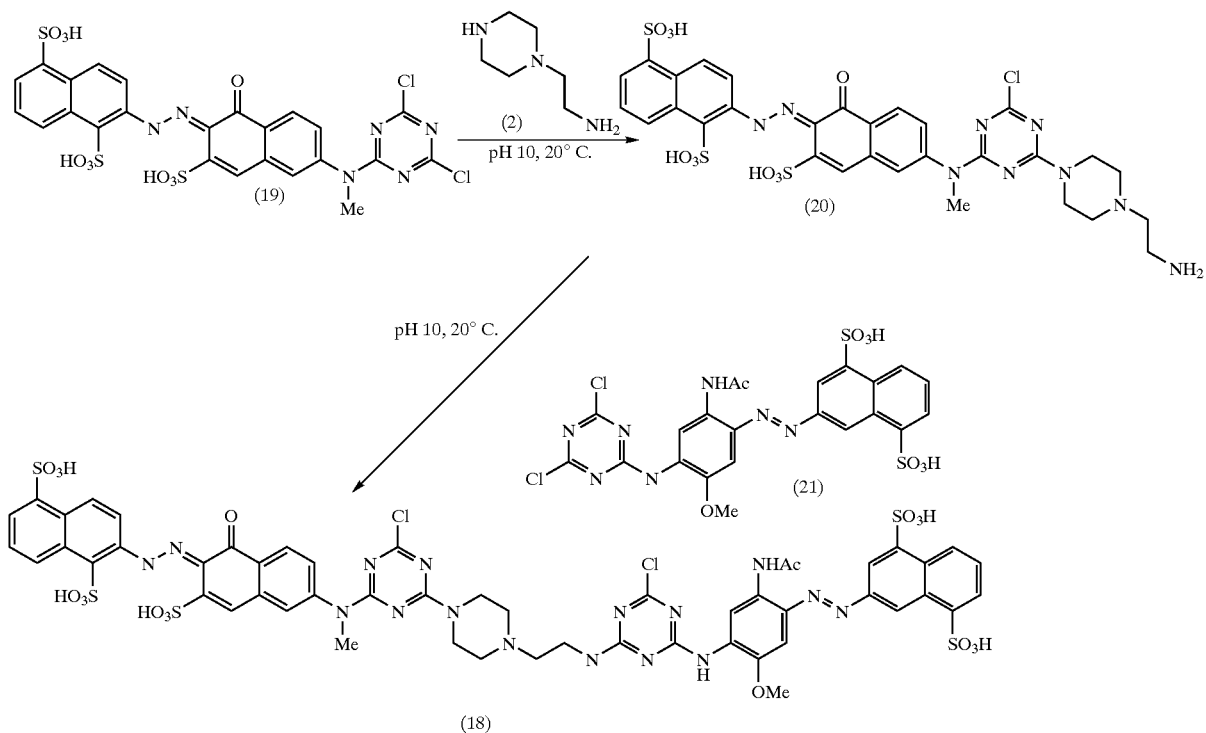
EXAMPLES 40–56
Following exactly analogous procedures as described in Example 39 the following dyes were synthesised.
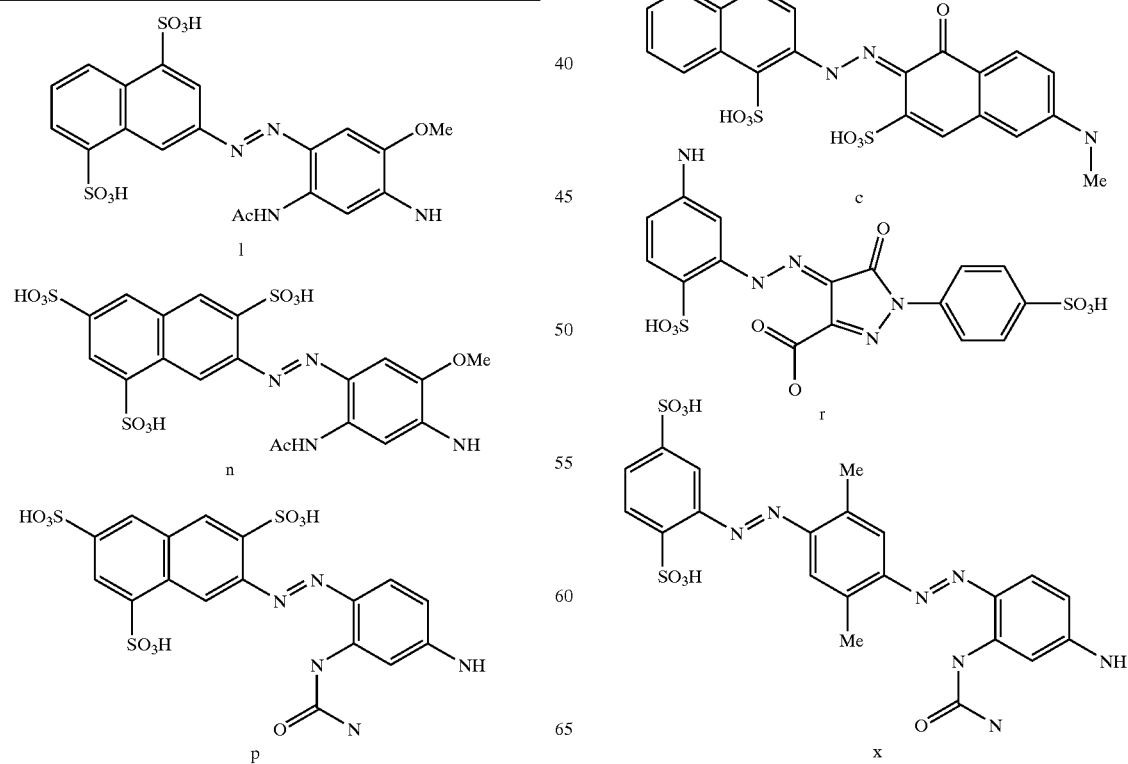

-continued
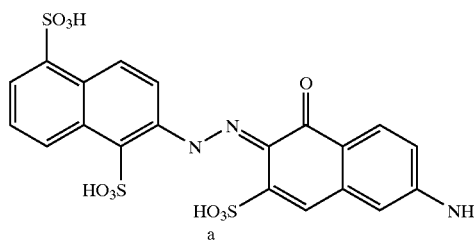
a
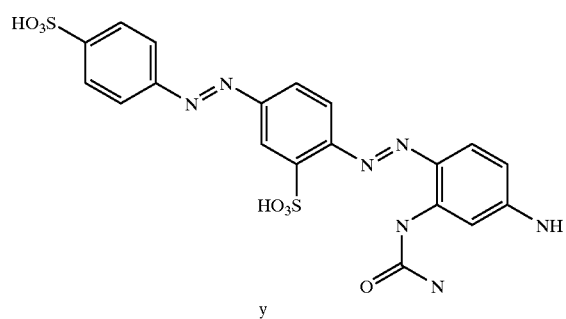
y
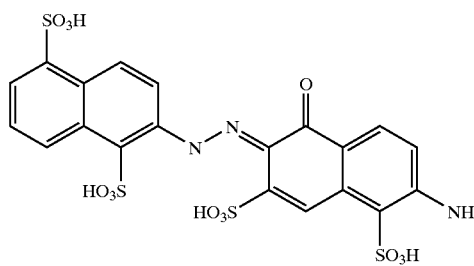
b
-continued
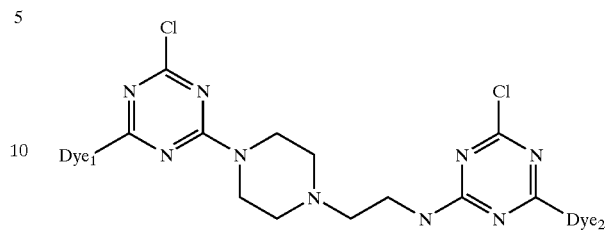
| Example | Dye 1 | Dye 2 | λ max/nm |
|---------|-------|-------|----------|
| 40 | b | x | 458 |
| 41 | b | y | 472 |
| 42 | c | y | 468 |
| 43 | a | x | 449 |
| 44 | c | x | 457 |
| 45 | a | y | 458 |
| 46 | a | p | 481 |
| 47 | a | r | 483 |
| 48 | a | l | 483 |
| 49 | n | p | 435 |
| 50 | c | n | 485 |
| 51 | n | c | 486 |
| 52 | n | l | 441 |
| 53 | l | n | 444 |
| 54 | p | r | 416 |
| 55 | l | r | 416 |
| 56 | l | p | 424 |
The dyes of the following Examples 57–95 can be synthezised by one of the methods given above.
EXAMPLE 57
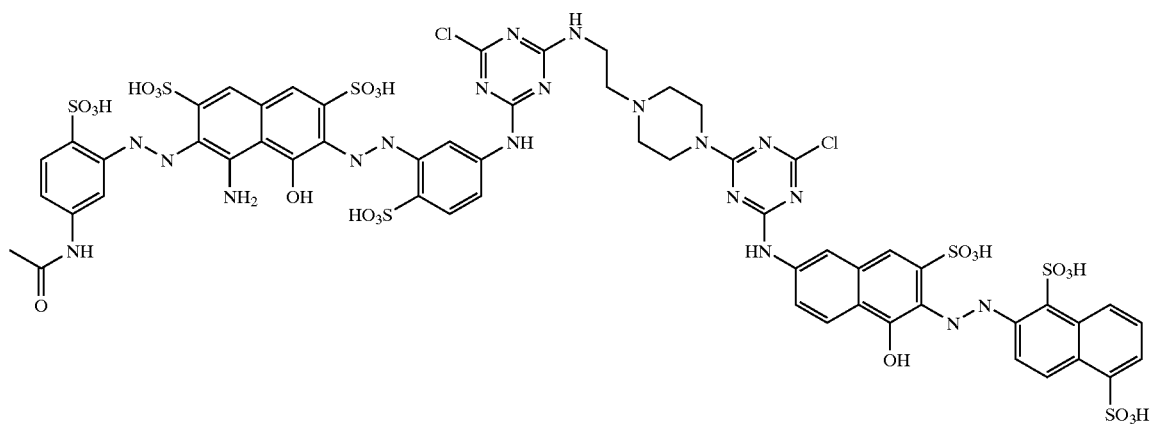
λmax=489 and 617 nm EXAMPLE 58
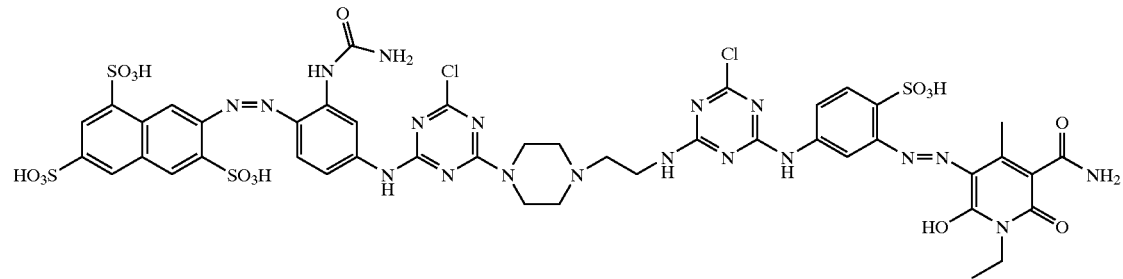
λmax=419
EXAMPLE 59
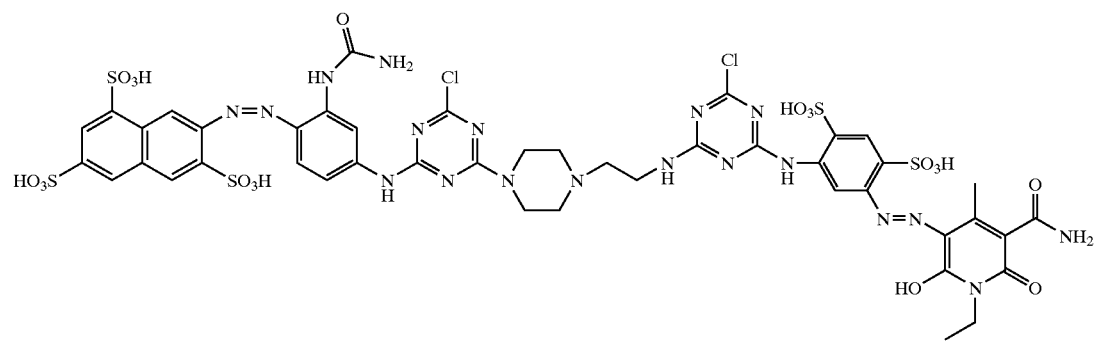
λmax=414.5
EXAMPLE 60
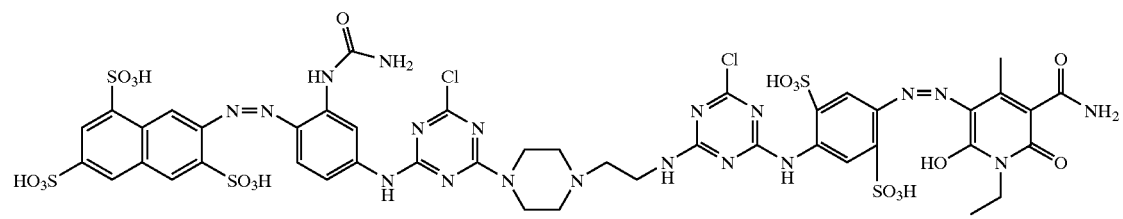
λmax=431

EXAMPLE 61
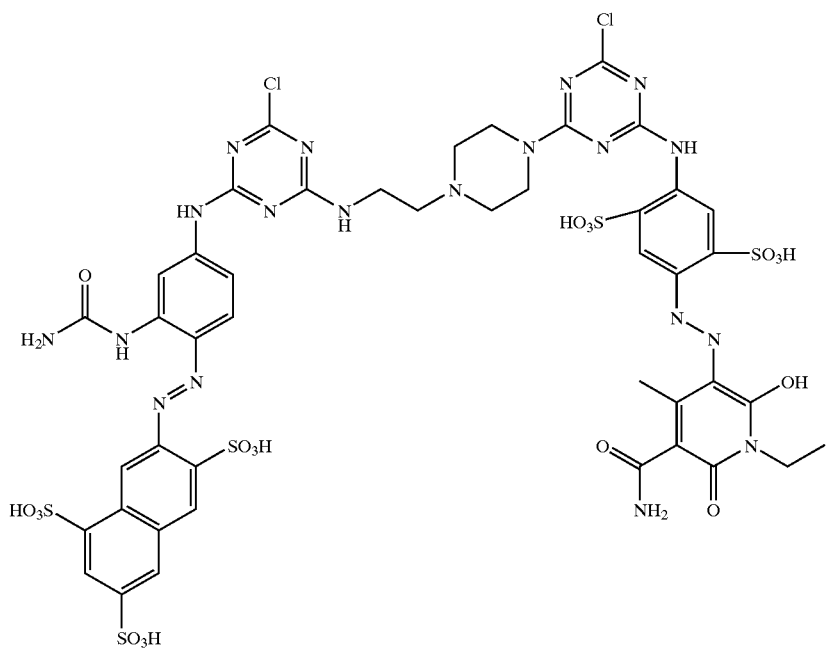
λmax=430
EXAMPLE 62
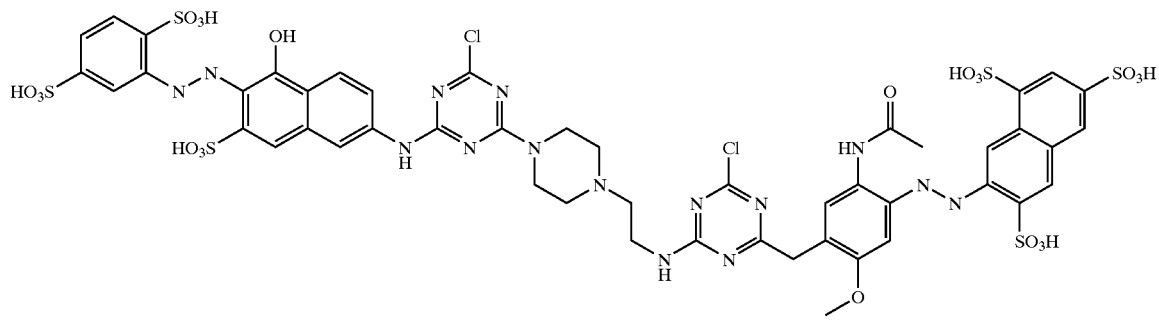
λmax=473
EXAMPLE 63
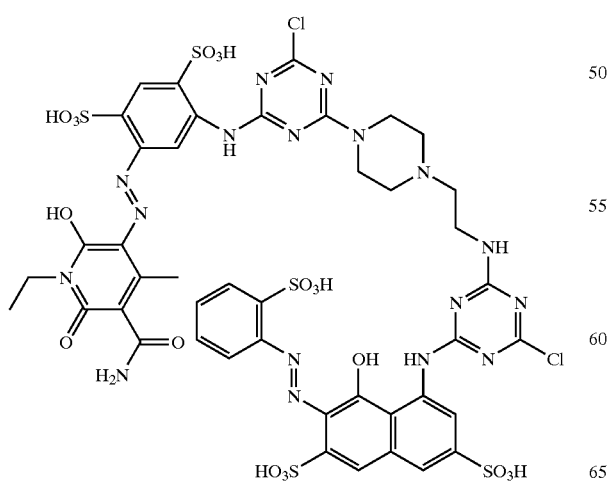
λmax=423

EXAMPLE 64
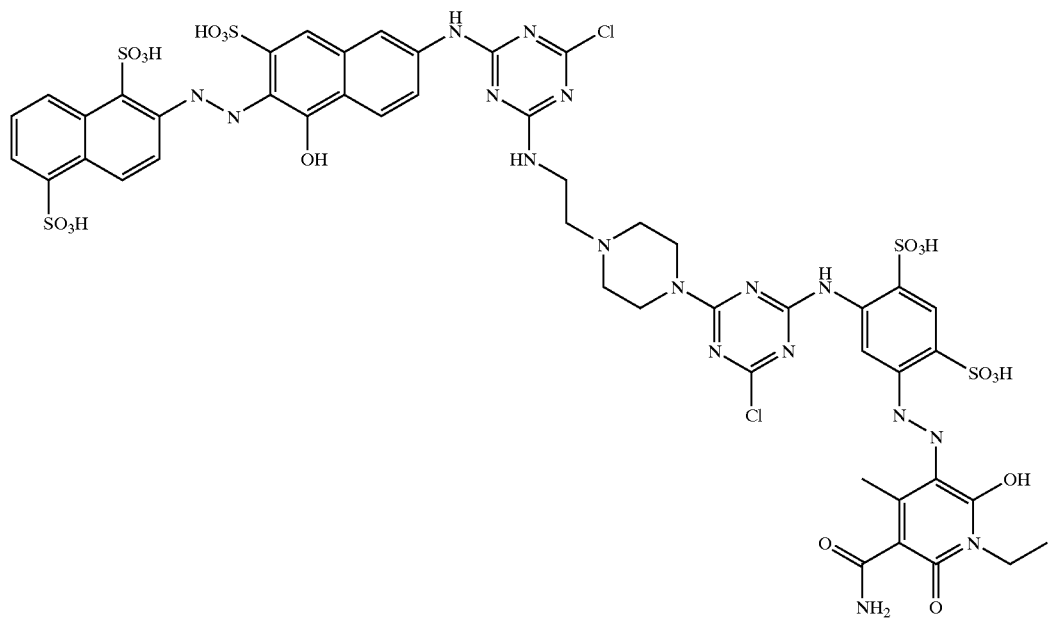
λmax=431
EXAMPLE 65
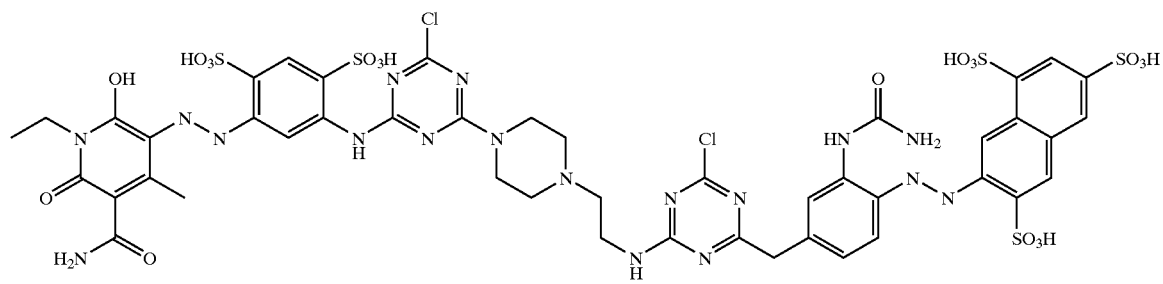
λmax=416
EXAMPLE 66
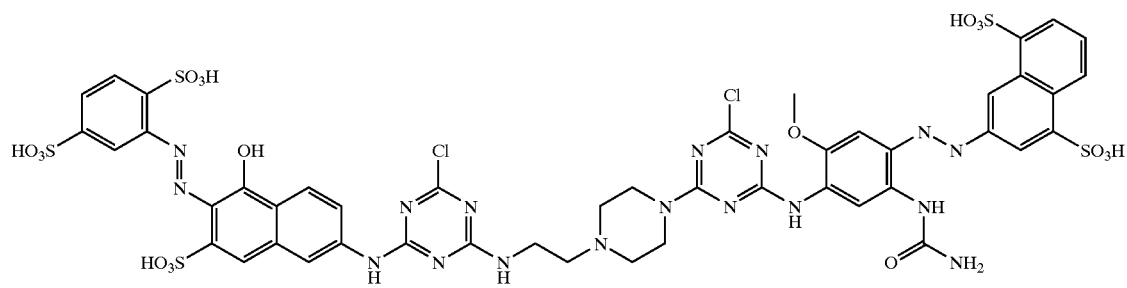
λmax=475

EXAMPLE 67
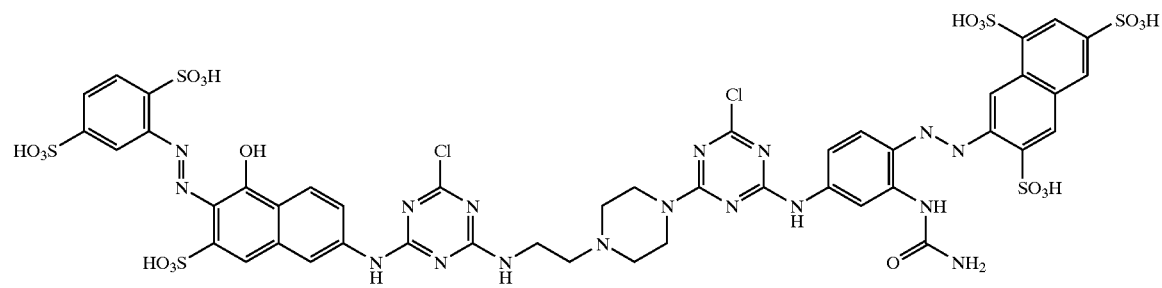
λmax=470
EXAMPLE 68
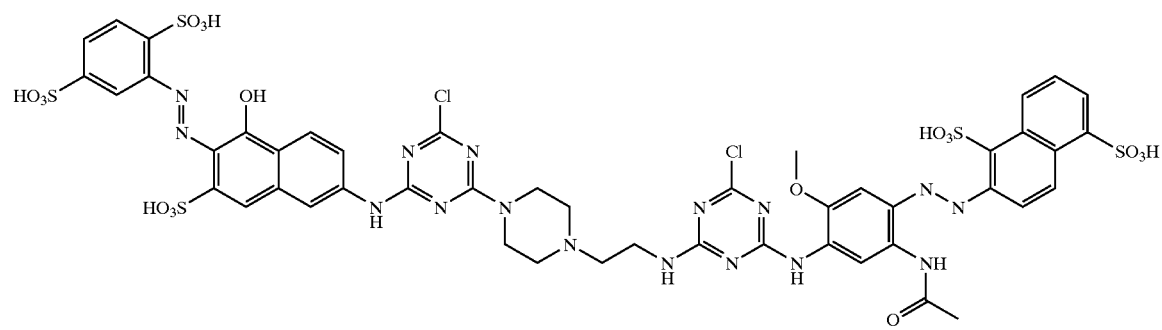
λmax=472
EXAMPLE 69
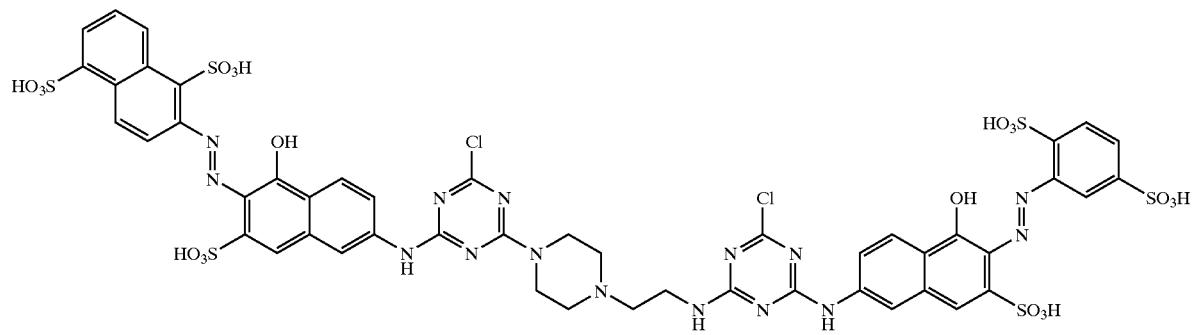
λmax=489
EXAMPLE 70
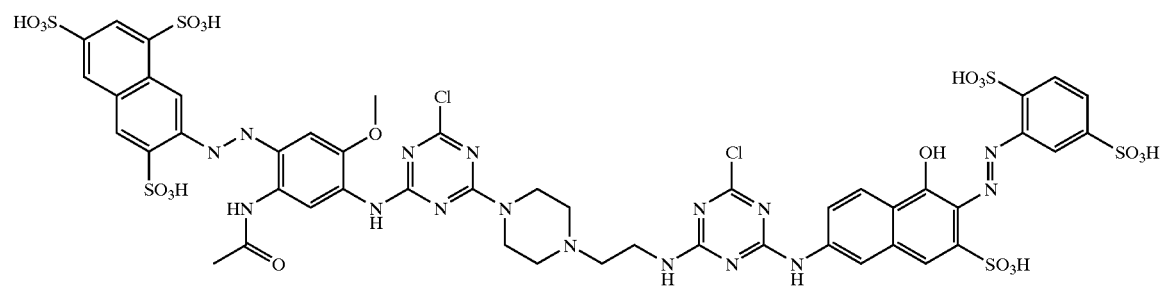
λmax=476

EXAMPLE 71
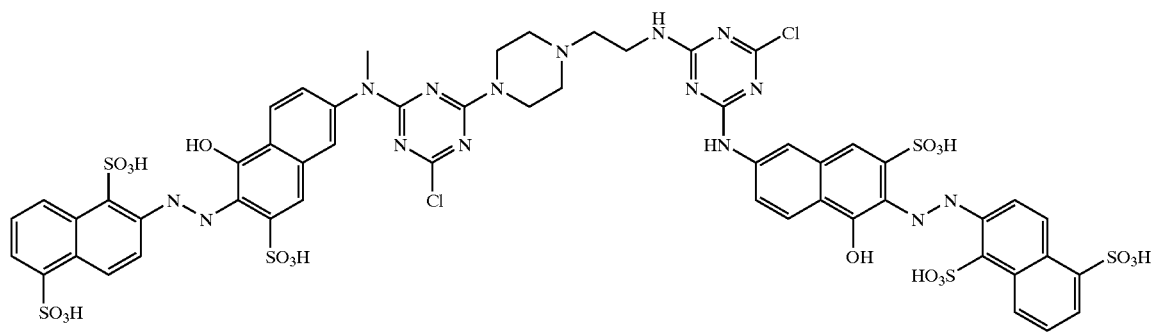
λmax=492
EXAMPLE 72
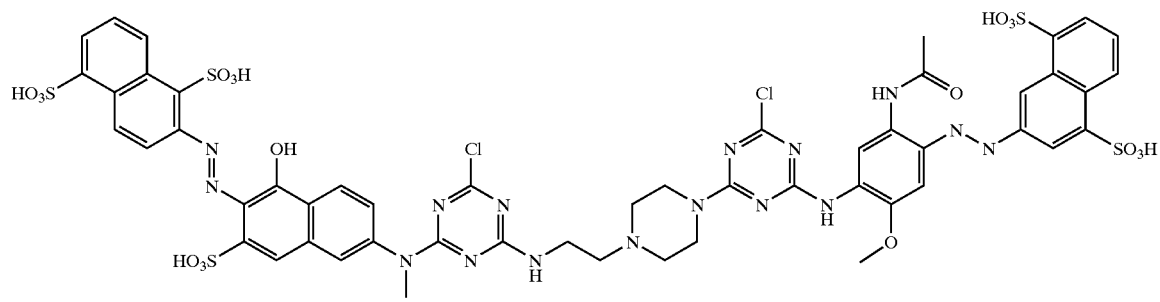
λmax=484
EXAMPLE 73
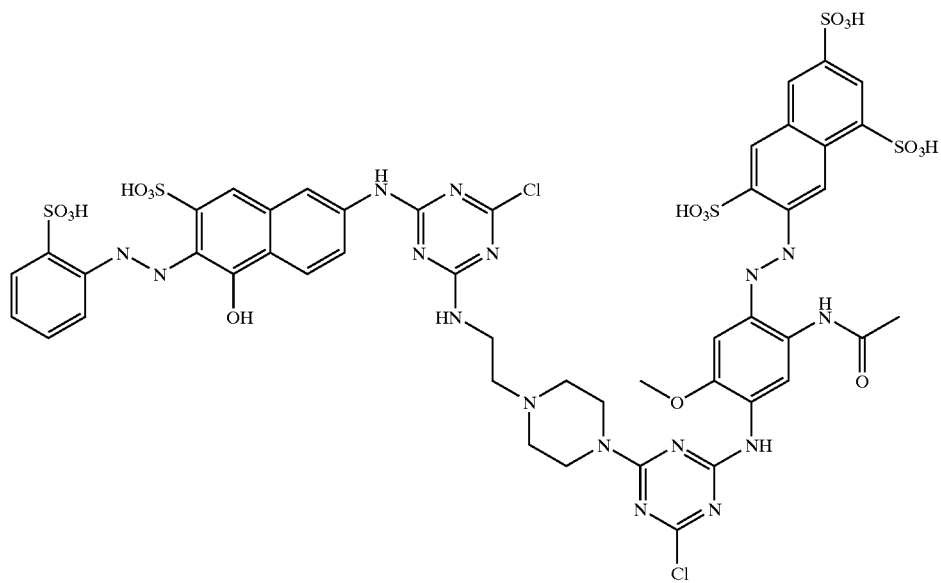
λmax=479

EXAMPLE 74
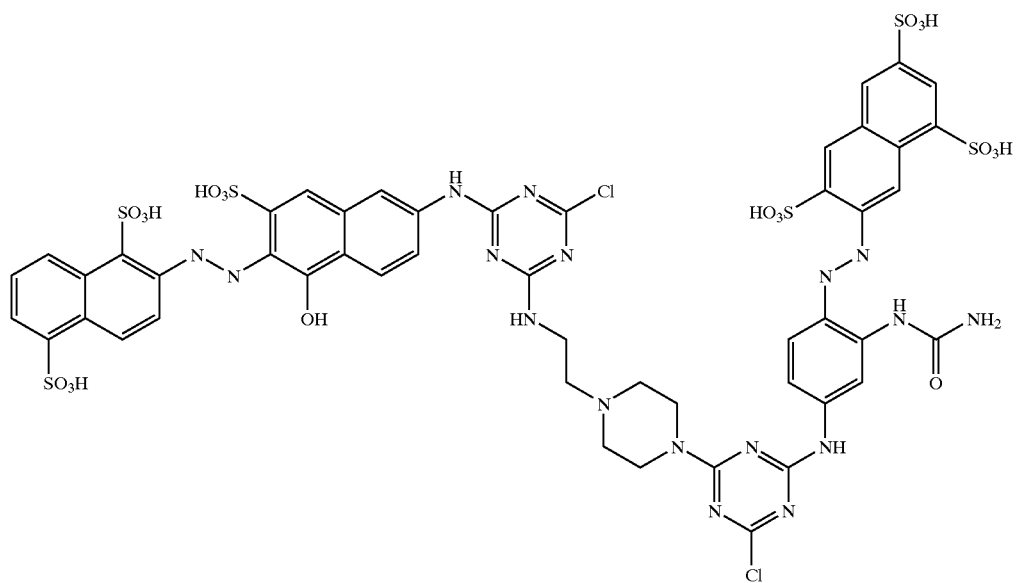
λmax=480
EXAMPLE 75
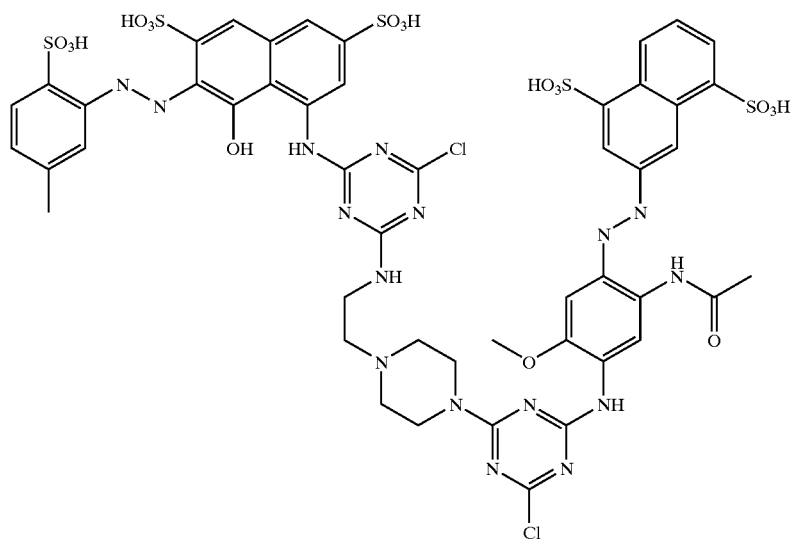
λmax=511

EXAMPLE 76
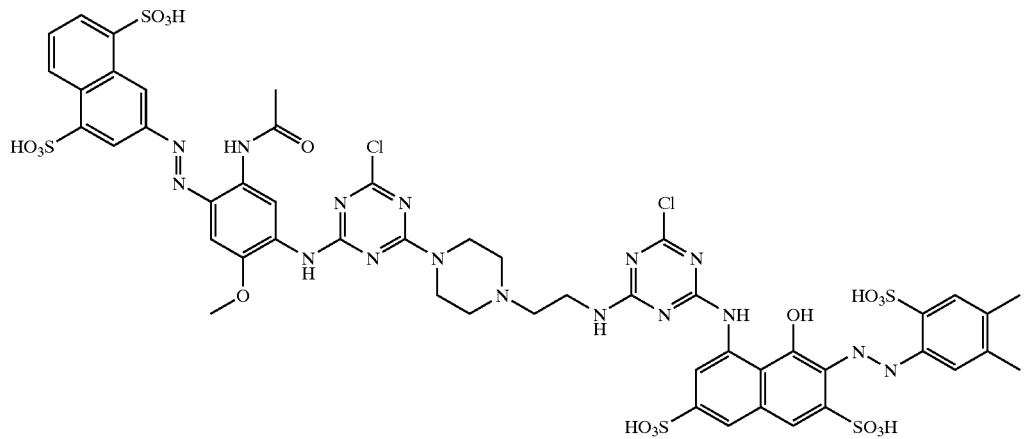
λmax=420
EXAMPLE 77
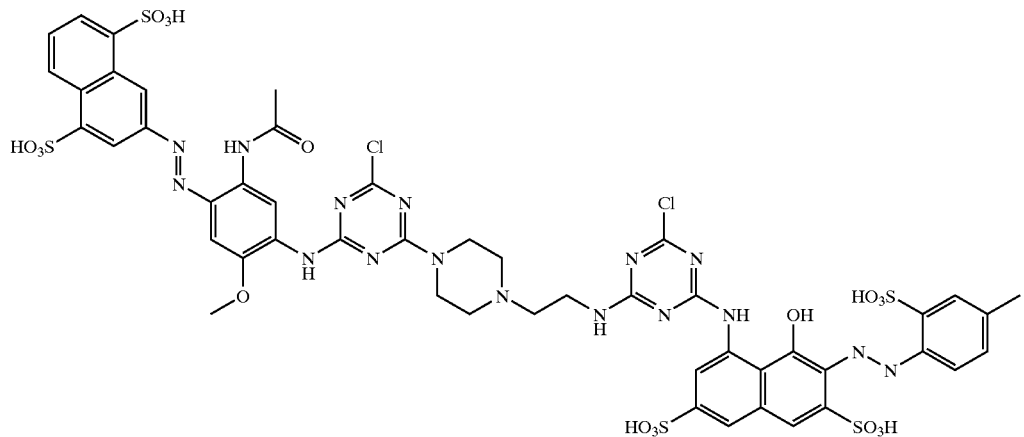
λmax=425
EXAMPLE 78
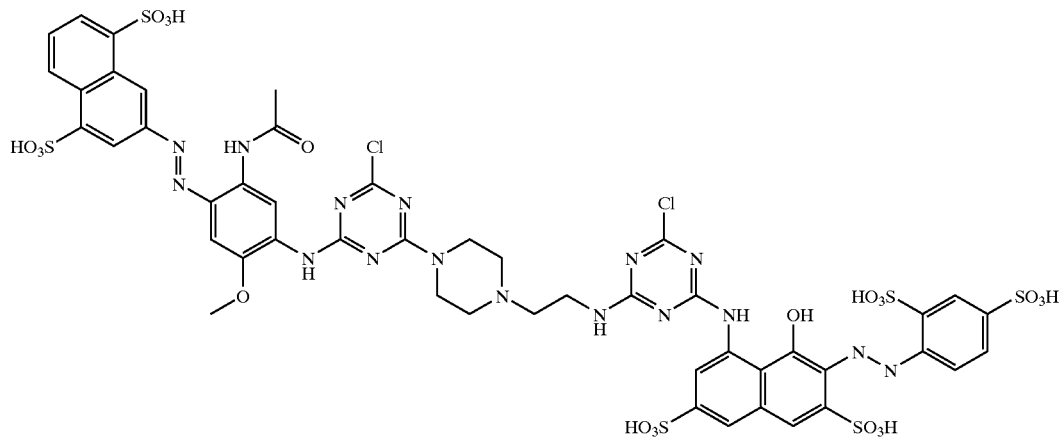
λmax=507

EXAMPLE 79
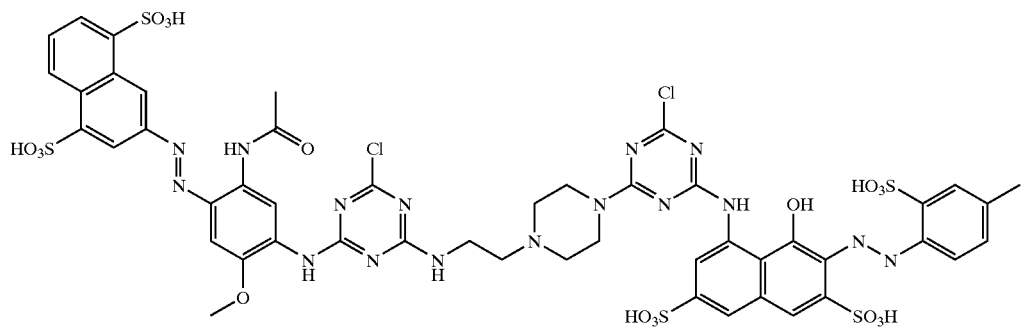
λmax=439
EXAMPLE 80
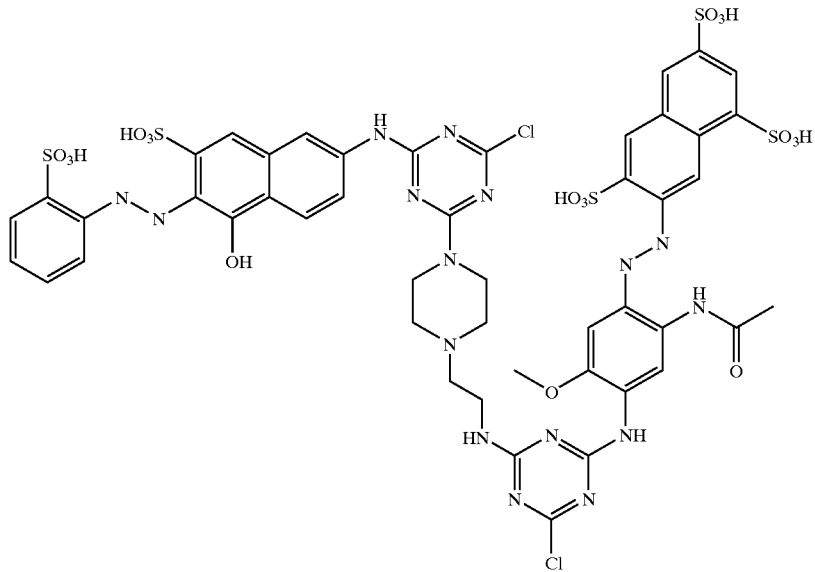
λmax=478
EXAMPLE 81
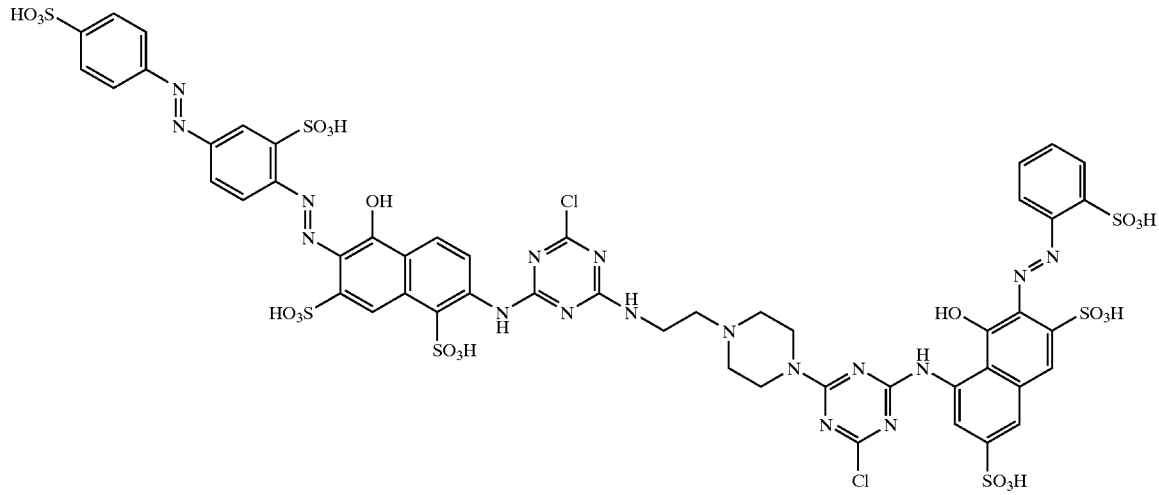
λmax=508

EXAMPLE 82
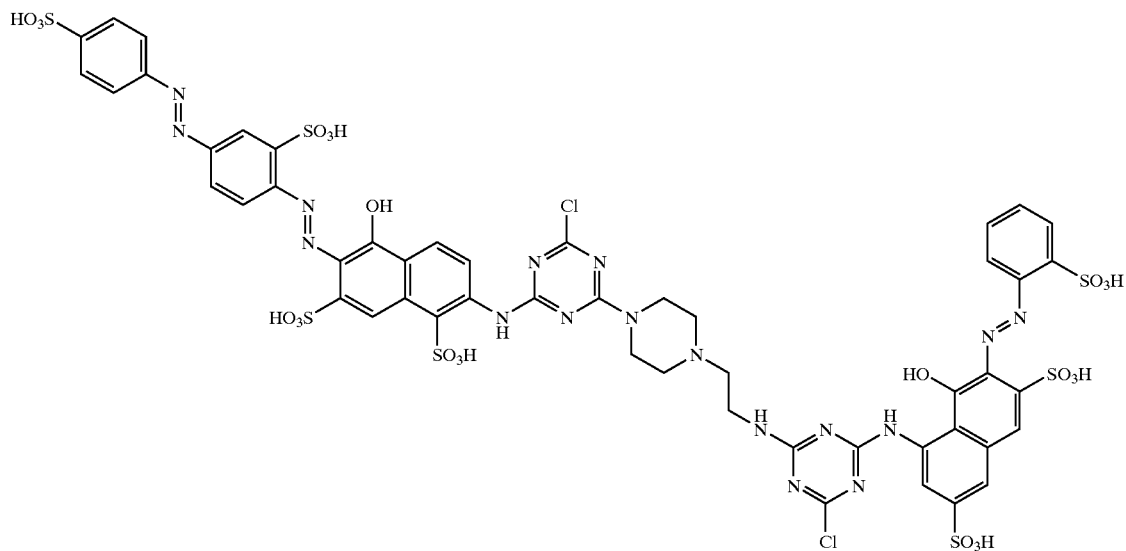
λmax=516
EXAMPLE 83
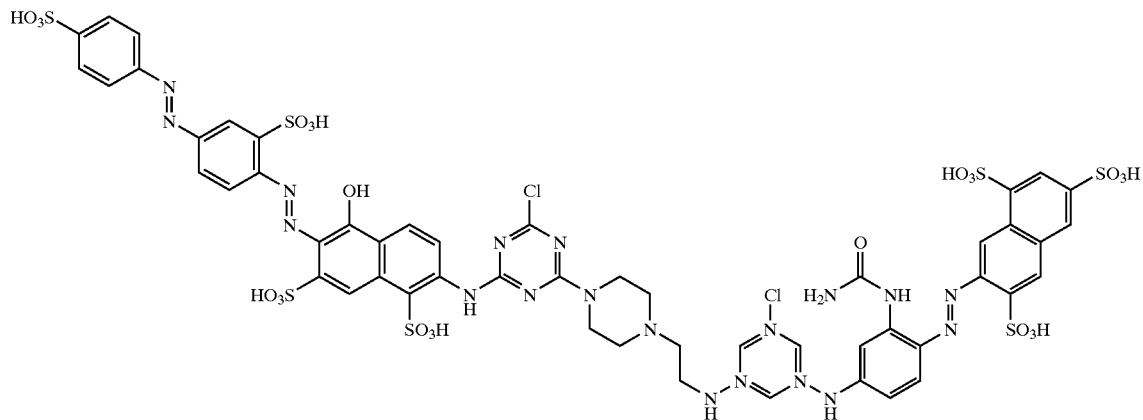
λmax=506
EXAMPLE 84
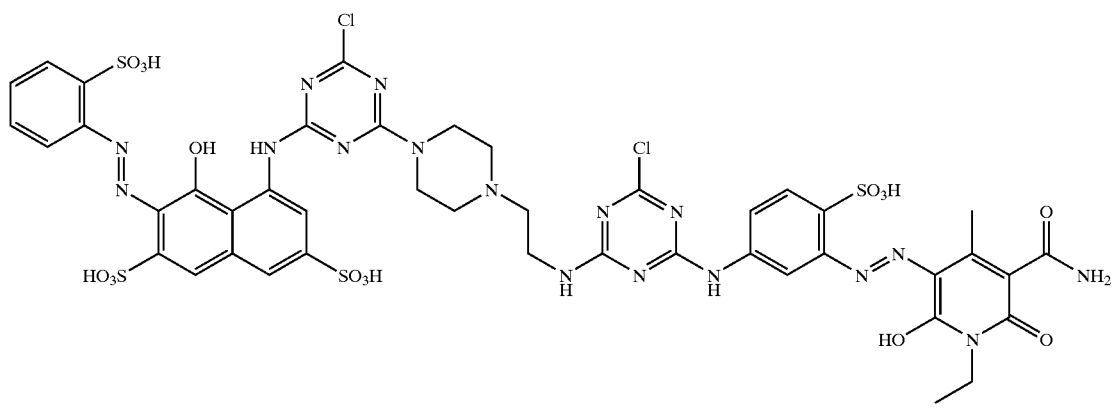
λmax=426

EXAMPLE 85
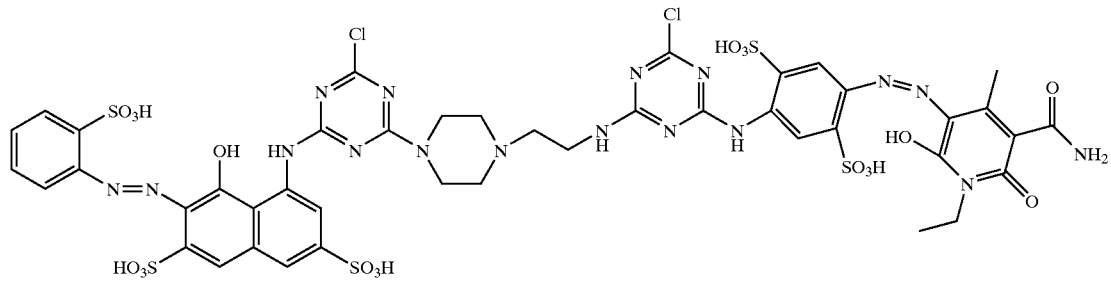
λmax=443
EXAMPLE 86
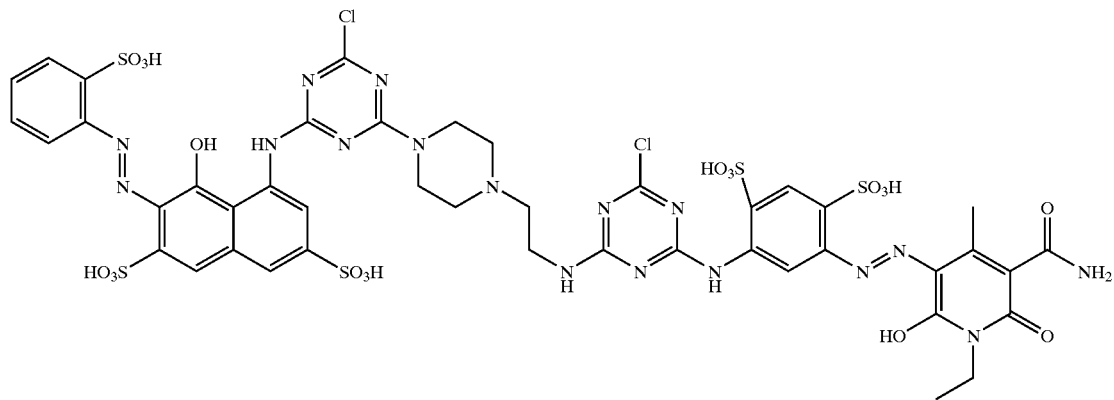
λmax 421
EXAMPLE 87
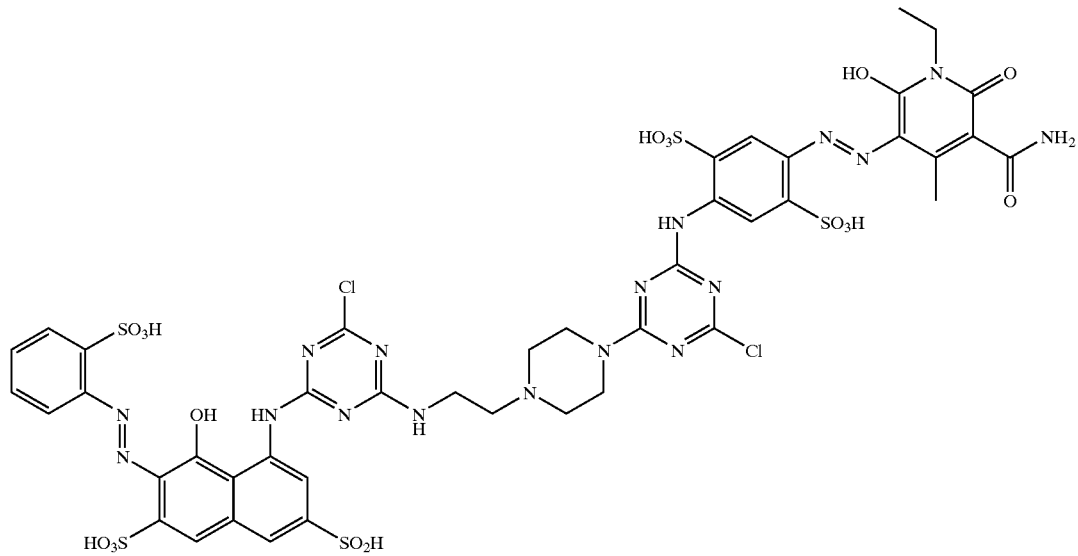
λmax=449

EXAMPLE 88
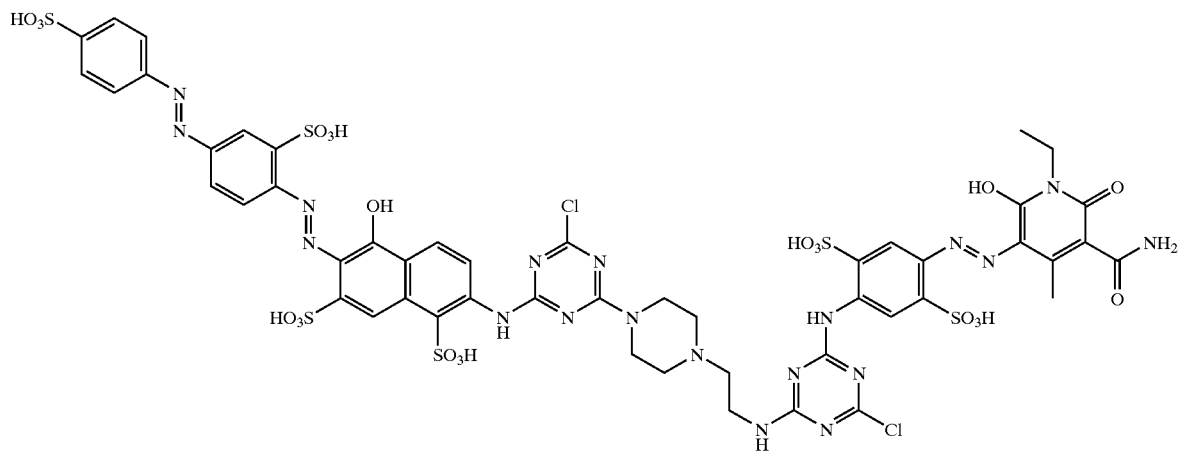
λmax=501
EXAMPLE 89
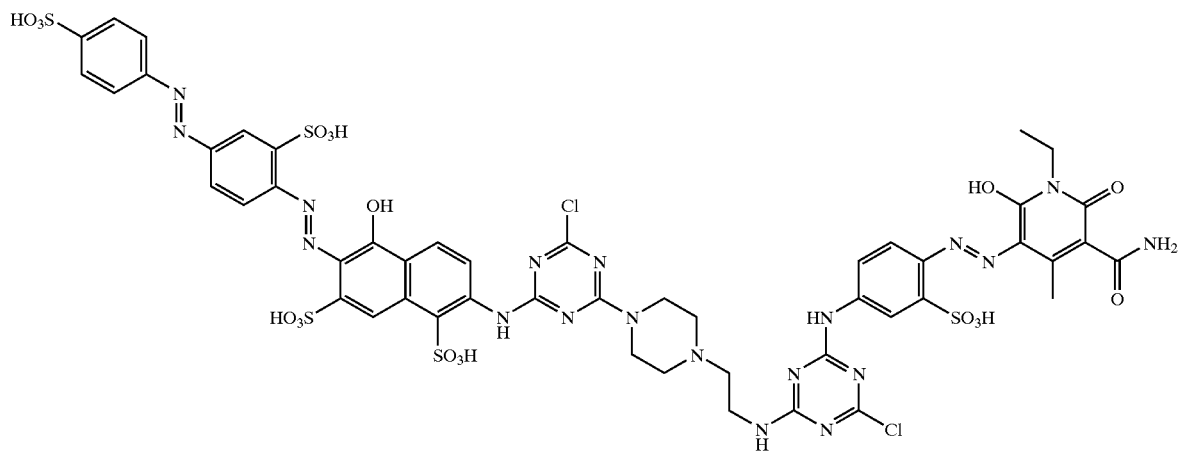
λmax=514
EXAMPLE 90
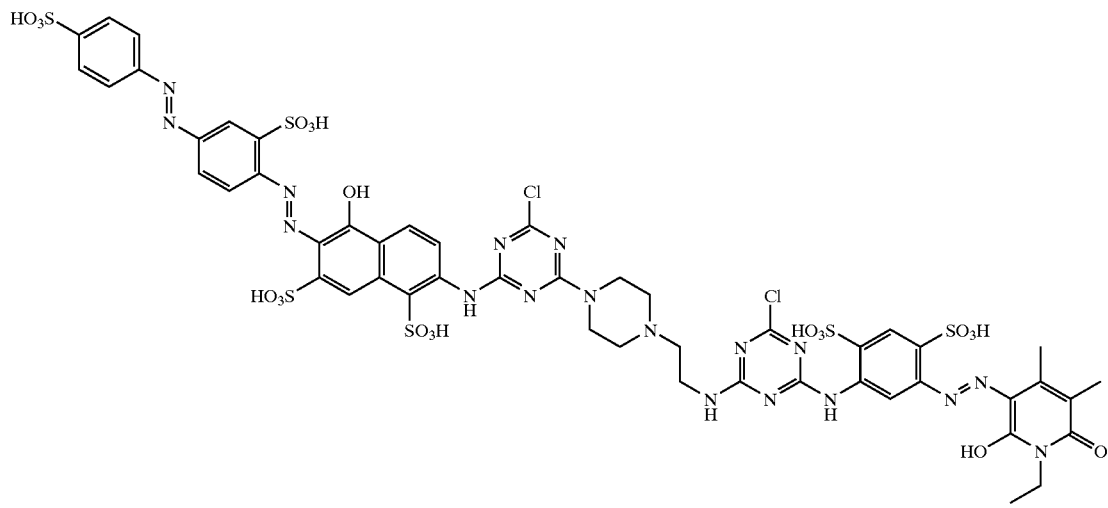
λmax=509

EXAMPLE 91
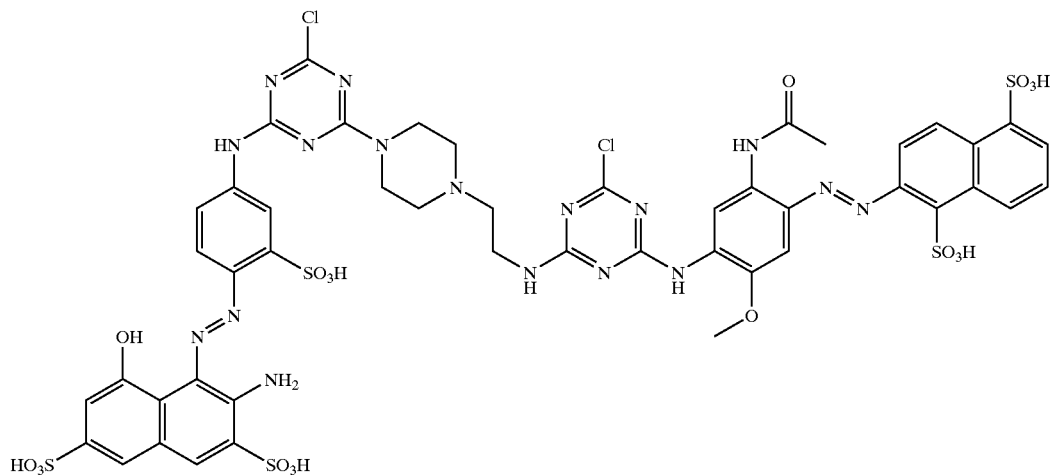
λmax=495
EXAMPLE 92
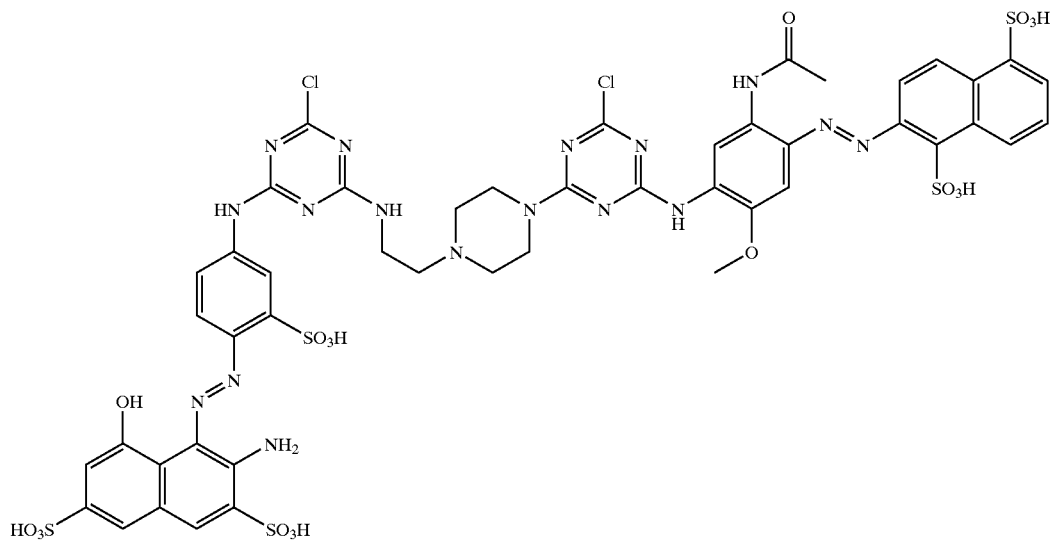
λmax=459
EXAMPLE 93
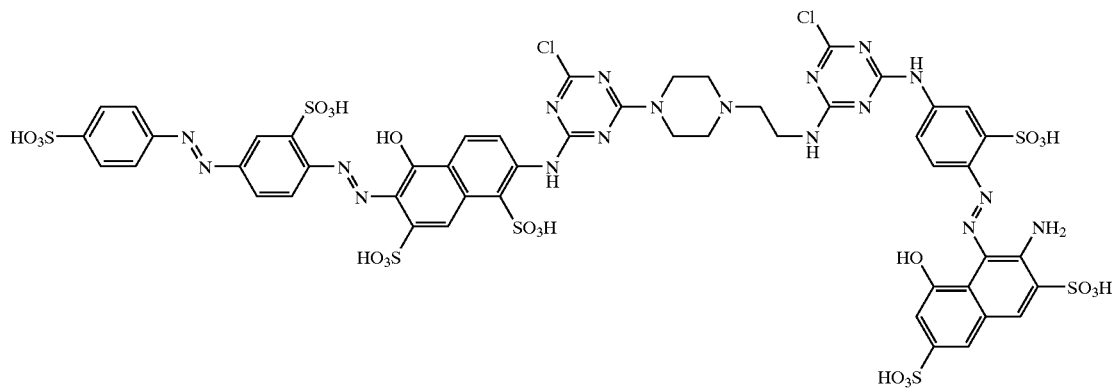
λmax=511

EXAMPLE 94

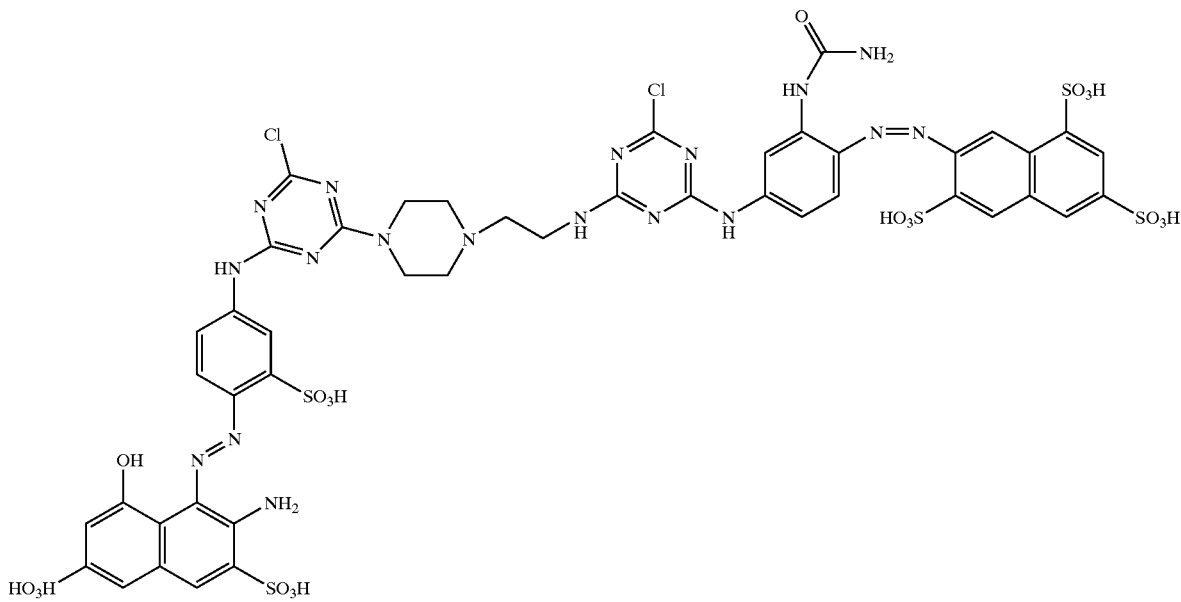

λmax=459

EXAMPLE 95

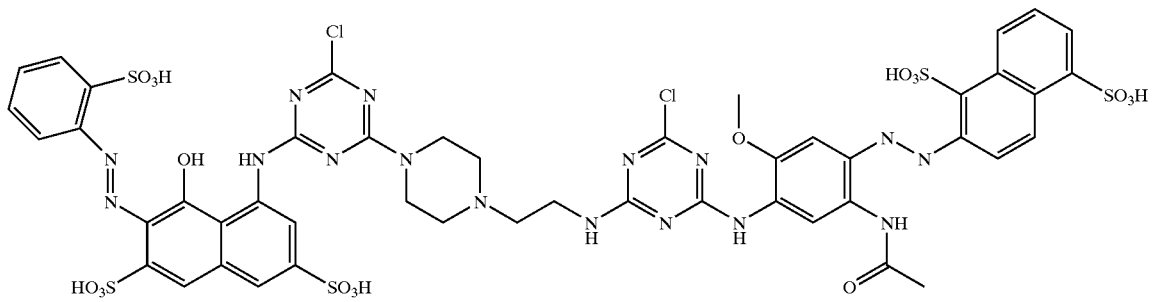

λmax=512

What is claimed is:

1. A dyestuff of the formula I

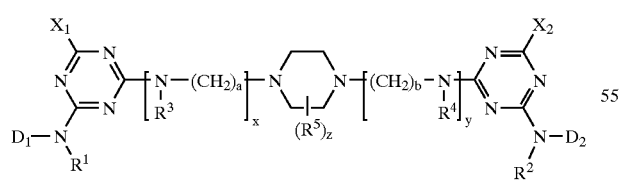

(I)

wherein
each of $R^1$, $R^2$, $R^3$, $R^4$ and $R^5$, independently, is H or an optionally substituted alkyl group;
each of $X_1$ and $X_2$, independently, is a labile atom or group;
each of x and y, independently, is 0 or 1 and at least one of x and y is 1;
each of a and b is 2 to 5 and when each of x and y is 1, a>b; and
z is 0, 1, 2, 3 or 4,
$D_1$ is a group of the formula II

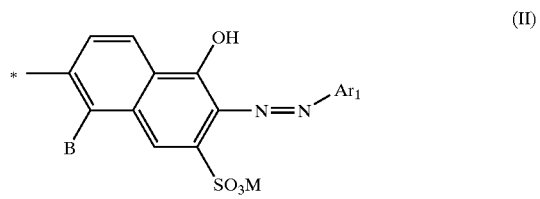

(II)

wherein
B is H or $SO_3M$;
M is H, an alkali metal, an ammonium ion or the equivalent of an alkaline earth metal;
*indicates the bond to the triazinylamino group;

Ar₁ is a group of the formula III or of the formula IV

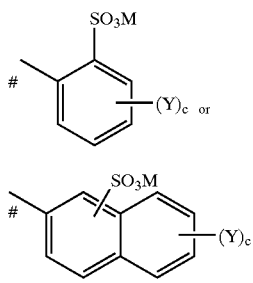

(III)

(IV)

wherein
the or each Y independently is SO₃M or an alkyl group, c is 0, 1 or 2, M is defined as given above and # indicates the bond to the azo group; or
D₁ is a group of the formula IIa

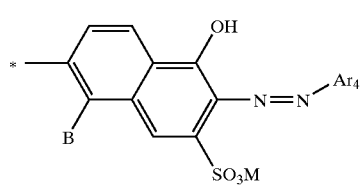

(IIa)

wherein
B is H or SO₃M;
M is H, an alkali metal, an ammonium ion or the equivalent of an alkaline earth metal;
*indicates the bond to the triazinylamino group;
Ar₄ is a group of the formula IIIa or of the formula IVa

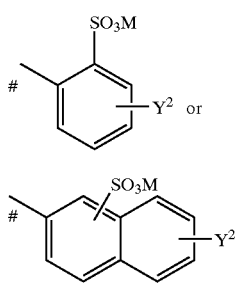

(IIIa)

(IVa)

wherein
$Y^2$ is —N=N—Ar₅, M is defined as given above and # indicates the bond to the azo group, wherein
Ar₅ is a group of the formula IIIb or of the formula IVb

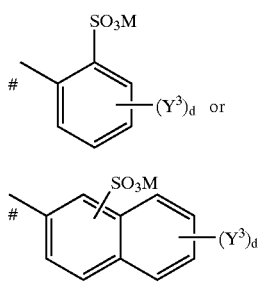

(IIIb)

(IVb)

wherein the or each $Y^3$ independently is SO₃M or an alkyl group, d is 0, 1 or 2, M is defined as given above and # indicates the bond to the azo group; or D₁ is a group of the formula V

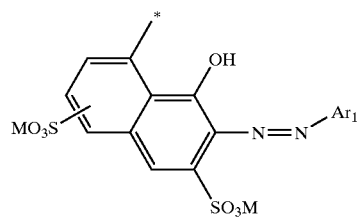

(V)

wherein
M, * and Ar₁ are defined as given above; or
D₁ is a group of the formula VI

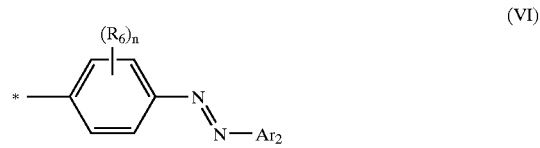

(VI)

wherein
* is defined as given above
n is 0, 1, 2 or 3;
the or each R₆ independently is H, $(C_1-C_4)$-alkyl, $(C_1-C_4)$-alkoxy, NHCONH₂, NHCO$(C_1-C_4)$-alkyl, SO₃M or halogen;
Ar₂ is a group of the formula VII or of the formula VIII

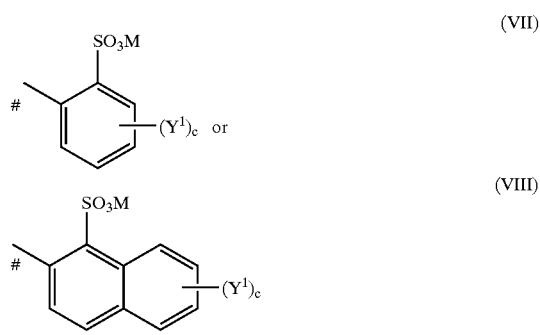

(VII)

(VIII)

wherein
the or each $Y^1$ independently is SO₃M or an alkyl group or —N=N—Ar₃, wherein:
Ar₃ is an optionally substituted phenylene or naphthylene moiety;
c is 0, 1 or 2, M is defined as given above and # indicates the bond to the azo group; or
D₁ is a group of the formula (XV)

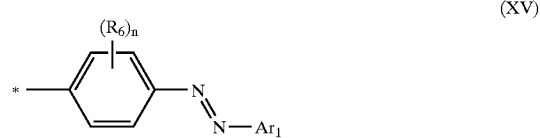

(XV)

wherein $R^6$, Ar₁, n and * are defined as given above or
D₁ is an azoacetoacetamidoaryl, azopyridone, azopyrazolone or an azopyrimidine chromophore;

$D_2$ is a group of the formula II, provided $D_1$ is not a group of the formula V; or $D_2$ is a group of the formula IIa; or $D_2$ is a group of the formula IX

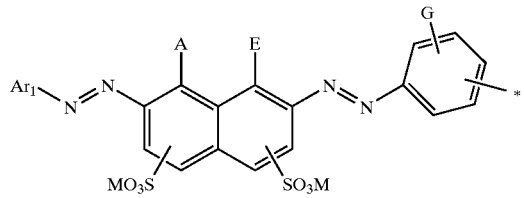

(IX)

wherein

A and E are independently OH or $NH_2$ and A≠E;

G is H, $(C_1-C_4)$-alkyl, $(C_1-C_4)$-alkoxy, $SO_3M$ or halogen; and $Ar_1$, M and * are defined as given above; or $D_2$ is a group of the formula VI; or $D_2$ is a group of the formula X

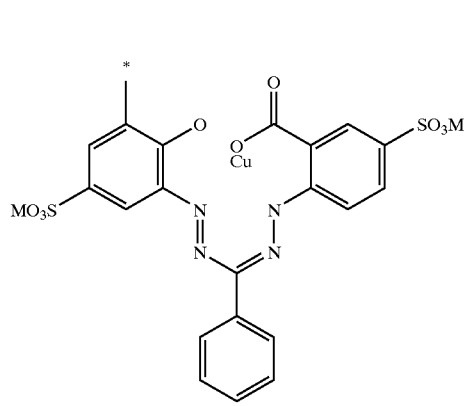

(X)

wherein M and * are defined as given above; or $D_2$ is a group of the formula XI

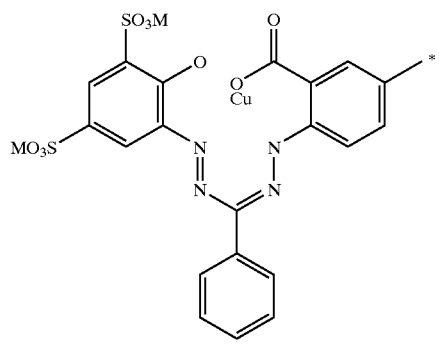

(XI)

wherein M and * are defined as given above; or $D_2$ is a group of the formula XII

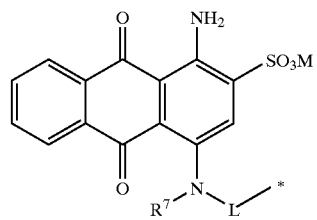

(XII)

wherein $R^7$ is H or $(C_1-C_4)$-alkyl;

L is a divalent moiety and

M and * are defined as given above; or $D_2$ is a group of the formula XIII

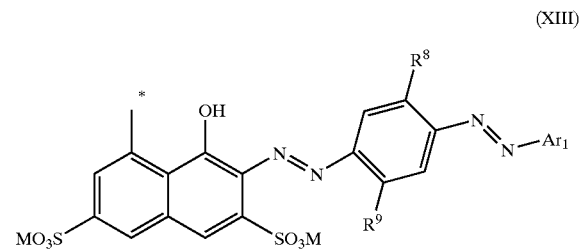

(XIII)

wherein $R^8$ and $R^9$, independently, are H, halogen, $(C_1-C_4)$-alkyl or $(C_1-C_4)$-alkoxy; and M, $Ar_1$ and * are defined as given above; or $D_2$ is a group of the formula XIV

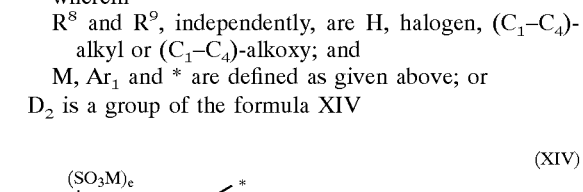

(XIV)

wherein

M' is a metal atom;

Pc is a phthalocyanine chromophore;

e is <4; and

M, L and $R^7$ are defined as given above; or $D_2$ is a group of the formula XV; or $D_2$ is an azoacetoacetamidoaryl, azopyridone, azopyrazolone or an azopyrimidine chromophore.

2. A dyestuff of the formula I as claimed in claim 1, wherein $D_1$ and $D_2$ both are a group of the formula (II), with the proviso, however, that $D_1 \neq D_2$ or $D_1 = D_2$ if $R^1 \neq R^2$.

3. A dyestuff of the formula I as claimed in claim 1, wherein $D_1$ is a group of the formula (II) and $D_2$ is a group of the formula (IX).

4. A dyestuff of the formula I as claimed in claim 1, wherein $D_1$ is a group of the formula (V) and $D_2$ is a group of the formula (XV).

5. A dyestuff of the formula I as claimed in claim 1, wherein $D_1$ is a group of the formula (XV) or an azoacetoacetamidoaryl, azopyridone, azopyrazolone or an azopyrimidine chromophore; and $D_2$ is a group of the formula (IX), a group of the formula (X), a group of the formula (XI), a group of the formula (XII), a group of the formula (XIII) or a group of the formula (XIV).

6. A dyestuff of the formula I as claimed in claim 1, wherein $D_1$ is a group of the formula (II), a group of the formula (VI) or an azoacetoacetamidoaryl, azopyridone, azopyrazolone or an azopyrimidine chromophore; and is $D_2$ is a group of the formula (VI), or an azoacetoacetamidoaryl, azopyridone, azopyrazolone or an azopyrimidine chromophore.

7. A dyestuff as claimed in claim 1, wherein $X_1$ and $X_2$ are halogen.

8. A dyestuff as claimed in claim 7, wherein $X_1$ and $X_2$ are chlorine.

9. A dyestuff as claimed in claim 1, wherein M is H or an alkaline metal.

10. A dyestuff as claimed in claim 8, wherein M is sodium.

11. A dyestuff as claimed in claim 1, wherein $R^3$, $R^4$ and $R^5$ are H.

12. A dyestuff as claimed in claim 1, wherein a=b=2 with x=0 and y=1 or x=1 and y=0.

13. A process for preparing the dyestuff of formula I as claimed in claim 1, which comprises reacting a piperazine compound of the formula XXIII (XXXIII)

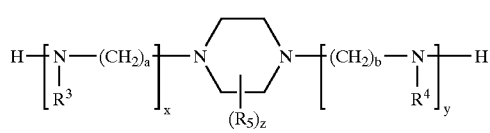

wherein $R^3$, $R^4$, $R^5$, a, b, x, y, and z are defined as given in claim 1, with a compound of the formula XXIV (XXIV)

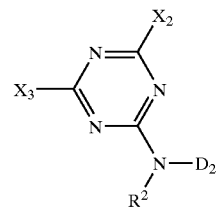

wherein $R^2$, $X_2$ and $D_2$ are defined as given in claim 1 and $X_3$ is a labile atom or a group capable of reaction with an amine, chlorine, and with a compound of the formula XXV (XXV)

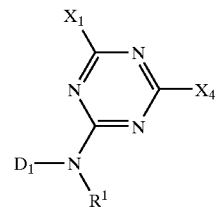

wherein $R^1$, $X_1$ and $D_1$ are defined as given in claim 1 and $X_4$ has one of the meanings of $X_3$.

14. A process for dyeing and printing hydroxy- and/or carboxamido-containing fibre materials which comprises contacting said material with the dyestuff of the formula I according to claim 1.

* * * * *

UNITED STATES PATENT AND TRADEMARK OFFICE
CERTIFICATE OF CORRECTION

PATENT NO. : 6,864,361 B2
DATED : March 8, 2005
INVENTOR(S) : Warren J. Ebenezer et al.

It is certified that error appears in the above-identified patent and that said Letters Patent is hereby corrected as shown below:

Column 63,
Line 11, "is $D_2$ is" should read -- $D_2$ is --.

Signed and Sealed this

Fourteenth Day of June, 2005

JON W. DUDAS
*Director of the United States Patent and Trademark Office*